US012784114B2

(12) United States Patent
Maleckar

(10) Patent No.: US 12,784,114 B2
(45) Date of Patent: Nov. 3, 2026

(54) METHOD AND PROCESS TO AUTOMATE FINANCIAL ACTIVITY ACCOUNTING ENTRIES AND ENTERPRISE RESOURCES ALLOCATION IN A DISTRIBUTED LEDGER TECHNOLOGY ENVIRONMENT

(71) Applicant: John Roderick Maleckar, Brambleton, VA (US)

(72) Inventor: John Roderick Maleckar, Brambleton, VA (US)

(73) Assignee: Dexterity Systems Holding Company LLC, Brambleton, VA (US)

( * ) Notice: Subject to any disclaimer, the term of this patent is extended or adjusted under 35 U.S.C. 154(b) by 0 days.

(21) Appl. No.: 19/179,956

(22) Filed: Apr. 15, 2025

(65) Prior Publication Data

US 2025/0245756 A1 Jul. 31, 2025

(51) Int. Cl.
*G06Q 40/12* (2023.01)
*G06Q 50/18* (2012.01)

(52) U.S. Cl.
CPC ........... *G06Q 40/12* (2013.12); *G06Q 50/188* (2013.01)

(58) Field of Classification Search
CPC ............................... G06Q 40/12; G06Q 30/06
See application file for complete search history.

(56) References Cited

U.S. PATENT DOCUMENTS

2019/0386833 A1* 12/2019 Alger .................... H04L 9/3239
2021/0065317 A1* 3/2021 Cali ....................... G06Q 50/18
2022/0172203 A1* 6/2022 Jeganathan ........ G06Q 20/4014
2023/0118213 A1* 4/2023 Quigley ................. G06Q 20/40
705/65

(Continued)

OTHER PUBLICATIONS

A. Chauhan, G. Savner, P. Venkatesh, V. Patil and W. Wu, "A Blockchain-Based Tracking System," 2020 IEEE International Conference on Service Oriented Systems Engineering (SOSE), Oxford, UK, 2020, pp. 111-115, doi: 10.1109/SOSE49046.2020.00020. (Year: 2020).*

(Continued)

*Primary Examiner* — Maria C Santos-Diaz
(74) *Attorney, Agent, or Firm* — Potomac Law Group, PLLC; Marc Kaufman

(57) ABSTRACT

The present invention automates, via smart contracts in a Distributed Ledger, the negotiation between a buyer and seller for the purchase/sale of a resource or asset in which: the buyer offers purchase terms, and the seller determines if the terms can be fulfilled at a satisfactory price. If the parties cannot negotiate mutually acceptable transaction terms, then the process terminates. If the negotiation succeeds, then the present invention automates transaction recording through seller's delivery and buyer's remuneration, completing the transaction. Once the purchase/sale transaction is complete, the operator executes smart contracts to record the accounting treatment for the asset or resource in multiple methods of accounting. Rather than posting accounting entries to legacy databases, the present invention posts each journal entry's debits and credits to the distributed ledger as discrete blocks, which can be: summarized in historical or prospective financial reports; used in mathematical computations; or, satisfy conditional statement hypotheses.

8 Claims, 26 Drawing Sheets

(56) References Cited

U.S. PATENT DOCUMENTS

| | | | | |
|---|---|---|---|---|
| 2023/0259992 | A1* | 8/2023 | Gopal | G01R 31/367<br>705/347 |
| 2026/0087350 | A1* | 3/2026 | Agostinelli | G06F 16/33295 |
| 2026/0121861 | A1* | 4/2026 | Gutierrez-Sheris | H04L 9/3218 |

OTHER PUBLICATIONS

M. I. Sarwar, I. Khan, L. A. Maghrabi, A. Jaffar and S. Akram, "Tripartite Accounting Framework: A Novel Blockchain-Based Model for Recording B2B Transactions," in IEEE Access, vol. 12, pp. 198097-198122, 2024 (Year: 2024).*

* cited by examiner

Hierarchy of Data Blocks

Hierarchy of Smart Contracts

Sample Transaction Value Block & Status/Date Block

Purchase-Sale Smart Legal Contract Transaction Critical Path

Transaction Flow Steps

Intramural Transaction: Smart Logistical Contracts

Balance Sheet Accounts & Related Primary Source Smart Contracts

| | | Primary Source Smart Contracts | | Offeror | | Offeree | |
|---|---|---|---|---|---|---|---|
| | Balance Sheet Accounts | Adjusting 1029 | Transaction 1022 | External Buyer | Internal Buyer | Internal Seller | External Seller |
| 1062 | Cash | | X | All | | | All |
| 1063 | Trade Accounts Receivable | X | | | | | |
| 1064 | Allowance for Doubtful Accounts | X | | | | | |
| 1065 | Finished Goods (MFG) - Made | X | X | | FG Function | Production (WIP) | |
| 1066 | Finished Goods (PFG) - Purchased | X | X | | FG Function | | Vendor |
| 1067 | Work in Process (WIP) | | X | | Production (WIP) | RM - DL - OH | |
| 1068 | Raw Materials (RM) | | X | | RM Function | | Vendor |
| 1069 | Allowance for Obsolete Inventory | X | | | | | |
| 1070 | Prepaid Expenses | X | | | | | |
| 1071 | Property Plant and Equipment (FA) | | X | | FA Function | | Vendor |
| 1072 | Accumulated Depreciation | X | | | | | |
| 1073 | Notes Receivable | | X | | Finance Function | | Debtor |
| 1074 | Goodwill | | X | | Finance Function | | Acquiree |
| 1075 | Tax Assets | X | | | | | |
| 1076 | Trade Accounts Payable | X | | | | | |
| 1077 | Credit Cards | X | | | | | |
| 1078 | Accrued Payroll | X | | | | | |
| 1079 | Deferred Revenue | X | | | | | |
| 1080 | Tax Liabilities | X | | | | | |
| 1081 | Notes Payable - Borrowed | | X | Bank/Lender | | Finance Function | |
| 1082 | Notes Payable - Repaid | | X | | Finance Function | | Bank/Lender |
| 1083 | Bonds | | X | Investors | | Finance Function | |
| 1084 | Common Stock | | X | Investors | | Finance Function | |
| 1085 | Preferred Stock | | X | Investors | | Finance Function | |
| 1086 | Retained Earnings | X | X | All | | | All |

Fig. 7

Income Statement Accounts & Related Primary Source Smart Contracts

| | | Primary Source Smart Contracts | | Offeror | | Offeree | |
|---|---|---|---|---|---|---|---|
| | **Income Statement Accounts** | **Adjusting 1029** | **Transaction 1022** | **External Buyer** | **Internal Buyer** | **Internal Seller** | **External Seller** |
| 1087 | Revenue | | X | Customer | | Sales | |
| 1088 | Sales Discounts | X | | | | | |
| 1089 | Cost of Goods Sold | X | X | Customer | | FG | |
| 1090 | Salaries and Wages | | X | | HR | | Employees |
| 1091 | Payroll Taxes | | X | | HR | | Taxing Agency |
| 1092 | Benefits | | X | | HR | | Benefit Company |
| 1093 | Rent & Utilities | | X | | Facilities | | Lessor/Utility |
| 1094 | Software Licenses | | X | | IT | | Vendor |
| 1095 | Office Expenses & Supplies | | X | | Overhead | | Vendor |
| 1096 | Accounting Services | | X | | Finance Function | | CPA Firm |
| 1097 | Legal Services | | X | | Management | | Law Firm |
| 1098 | Insurance | | X | | Management | | Insurer |
| 1099 | Bank Charges & Fees | | X | | Overhead | | Bank |
| 1100 | Advertising | | X | | Sales | | Ad Agency |
| 1101 | Warehousing & Storage | | X | | Facilities | | Warehouse |
| 1102 | Freight / Shipping | | X | | Shipping & Receiving | | Shipper |
| 1103 | Bad Debt Expense | X | | | | | |
| 1104 | Interest Expense | | X | | Finance Function | | Bank/Lender |
| 1105 | Depreciation Expense | X | | | | | |
| 1106 | Obsolete Inventory Expense | X | | | | | |
| 1107 | Interest/Investment Income | | X | Borrower /Investee | | Finance Function | |
| 1108 | Income Tax Expense | X | X | | Finance Function | | Taxing Agency |

Fig. 8

Cascading Purchase-Sale Transactions

Cascading Intramural Transactions - Production Order

Production Costs Realized

Flow of Journal Entries

Foreign Currency Exchange Rates Applied to Entries

Smart Contract Process to Reconcile Cash in Bank to System Balance

Smart Contract Process to Record Investment Unrealized Gains & Losses

Bases and Methods of Accounting

Internal-External Purchase-Sale Transaction - Equipment

Smart Contract Process to Account for a 3-Year Subscription Under US GAAP vs. Cash Basis Financial Statements & Forecasts by Entry-Status Sets

METHOD AND PROCESS TO AUTOMATE FINANCIAL ACTIVITY ACCOUNTING ENTRIES AND ENTERPRISE RESOURCES ALLOCATION IN A DISTRIBUTED LEDGER TECHNOLOGY ENVIRONMENT

BACKGROUND OF THE INVENTION

Legacy Accounting Systems

Since the thirteenth century, accountants have been recording financial transactions through the application of double-entry bookkeeping. This method, also known as double-entry accounting, relies on a two-sided entry system to maintain accurate financial records. Each transaction requires an equal and opposite entry in different accounts, adhering to the fundamental principle that the sum of debits must equal the sum of credits.

Double-entry bookkeeping ensures that assets equal liabilities plus equity, where equity includes investments and cumulative revenues minus expenses. The accounting equation serves as a crucial error detection tool; any discrepancy between the total debits and credits indicates an error has occurred.

The primary books and records used in this system include the General Ledger, Subsidiary Ledgers (such as Accounts Receivable, Accounts Payable, and Fixed Assets), and various Journals (including the General Journal, Cash Receipts Journal, and Cash Disbursement Journal). Ledgers provide a self-balancing set of accounts, while Journals list transactions that are subsequently summarized and posted to a Ledger. To access more detailed information, accountants trace transactions to their original Journals, entries, and source documents. Historically, these records were maintained as paper relational databases, whereas modern computerized systems use electronic forms of the same ledgers and journals.

Accountants consistently apply a chosen basis of accounting when recording transactions and preparing financial statements. Common bases of accounting include cash, accrual, modified cash, and income tax accounting. The cash basis records revenue upon receipt and expenses upon payment, while the accrual basis records revenue when earned and expenses when liabilities are incurred. Modified cash combines elements of cash basis accounting with the depreciation of long-lived assets. Income tax accounting adheres to regulations such as the Internal Revenue Code in the United States or applicable jurisdictional tax laws.

The objective of standardized accounting principles is to ensure transparency, consistency, and comparability within financial reporting across organizations. These principles are codified by entities such as: The Financial Accounting Standards Board (Generally Accepted Accounting Principles in the United States), and the International Accounting Standards Board (International Financial Reporting Standards). While applying these principles requires judgment and estimation, most financial activities can be recorded following specific conditional statements based on the selected accounting method.

Computerized relational database management systems (RDBMS) have significantly improved the maintenance and reporting of accounting, financial, inventory, and personnel/payroll information. Enterprise resource planning (ERP) systems offer timelier information, reduced labor requirements, and increased accuracy compared to manually maintained records. Once an entry is posted in modern computerized systems, the process is streamlined as the entry is carried forward to all relevant books and ledgers. These systems also enhance efficiency by maintaining customer, vendor, and payroll databases and performing routine computations such as inventory costing using methods like first-in, first-out or average cost.

Despite the structured nature of these relational databases, the process of recording entries and activities relies heavily on professional accountants and managers applying specific accounting methods. Additionally, even robust accounting systems necessitate ancillary processes and methods, particularly when allocating resources to production or fulfilling contractual obligations.

Blockchain Overview

A blockchain is a digitized, decentralized, public ledger of events, contracts, or transactions. Participants or parties to a series of events have access to the chain. Each new "block" links to the previous block in chronological order. Blockchains use distributed ledger technology (DLT) which are independent computers ("nodes") to record, share and synchronize transactions in their respective electronic ledgers, instead of keeping data centralized as in a traditional ledger.

Blockchain owes its name to the way it stores transaction data: in blocks linked to form a chain. As the number of transactions grows, so does the blockchain. Blocks record and confirm the time and sequence of transactions, which are then logged into the blockchain within a discrete network governed by rules agreed on by the network participants.

Each block contains a hash (a digital fingerprint or unique identifier), a timestamp, and the hash of the previous block. The hash links the blocks together and prevents any block from being altered or a block being inserted between two existing blocks. A blockchains' participants include the two parties of the contract: Buyer and Seller. However, the Buyer and Seller may give access to the blockchain to anyone they want, such as banks, auditors, attorneys, or regulators, as necessary. The blockchain creates an indelible record that cannot be changed without a plurality of participants in the chain. So, the blockchain becomes almost unbreakable, which is why blockchain is used for cryptocurrencies.

A "node" is a computer connected to the network. Each node with permission to the blockchain is notified of any new blocks in the chain. The alert initiates a transaction and related journal entries to the node's internal (non-public) ledger. A DLT can digitize, code, and insert any document into the blockchain.

The DLT is a ledger in the accounting definition of being a self-balancing set of accounts for cryptocurrencies, since the DLT maintains all transactions. However, when using blockchain technology to account for smart contracts, the DLT is more of a locked, programmable filing cabinet with each drawer of the cabinet representing a block. Parties requiring access to the blockchain have a key to the entire cabinet. Further, the DLT can add infinitely many drawers to the cabinet.

Smart contracts are self-executing programs that automate transactions when certain conditions are met. They are stored on a blockchain, a decentralized network that makes it difficult to change or tamper with the contract. In general, a smart contract is created with a set of conditions and actions; is stored on a blockchain, and, when the conditions are met, the contract automatically executes the actions.

Conclusion

While computerized legacy accounting systems have increased efficiency and accuracy over manually posting entries to journals and carrying forward summaries to ledgers, issues and constraints remain: (a) Just as there is limited amount of space on a physical page in an accounting ledger or journal, fields' widths in a computerized accounting-application database have a predefined, finite width character length. The field widths are determined when the databases are designed and cannot be adjusted. (b) Accounting RDBMSs are designed for a single accounting basis with rare exceptions for small entity systems that may toggle between cash and accrual. In addition, an accounting RDBMS are blank pages linked together without regard to the accounting principles to be applied. These accounting systems rely on knowledgeable professional accountants and managers to properly apply the accepted principles when posting entries. (c) RDBMS don't easily scale. That is, while a small entity can use an off-the-shelf system with little or no customization, these low-level accounting systems are so limited that even a mid-sized entity cannot use the same system and must upgrade to a more robust platform that can be tailored, which is expensive. Further, large multi-national companies must have ERPs designed and built specifically for that particular entity which is expensive. (d) Journal entries cannot be automated except for recuring entries (periodically for the same amounts over a range of time) and simple reversing journal entries. (e) Accounting systems can be vulnerable to hackers unless security protocols are implemented, which can be costly to design, monitor, and upgrade.

SUMMARY OF THE INVENTION

The present invention is a method and process of recording the financial activity of an enterprise in using Distributed Ledger Technology (DLT) in a blockchain environment in which data is maintained in individual blocks and the processing and transaction recording, adjustments and reconciliations are performed by smart contracts. Functions and activities that are not executed by smart contracts are performed by operators, which may be a professional manager or an Artificial Intelligence (AI) system including the algorithms, data sets, and computational infrastructure that enable AI functionalities.

BRIEF DESCRIPTION OF DRAWINGS

FIG. 7 is a schedule of Balance Sheet accounts noting the whether the primary source of the account is either a transaction smart contract, or accounting method adjustment smart contract. If the primary source is transactional, then the external or internal offeror (buyer) and offeree (seller) is listed.

FIG. 8 is a schedule of Income Statement accounts noting the whether the primary source of the account is either a transaction smart contract, or accounting method adjustment smart contract. If the primary source is transactional, then the external and internal offeror (buyer) and offeree (seller) is listed.

DETAILED DESCRIPTION OF THE INVENTION

Figure 1:
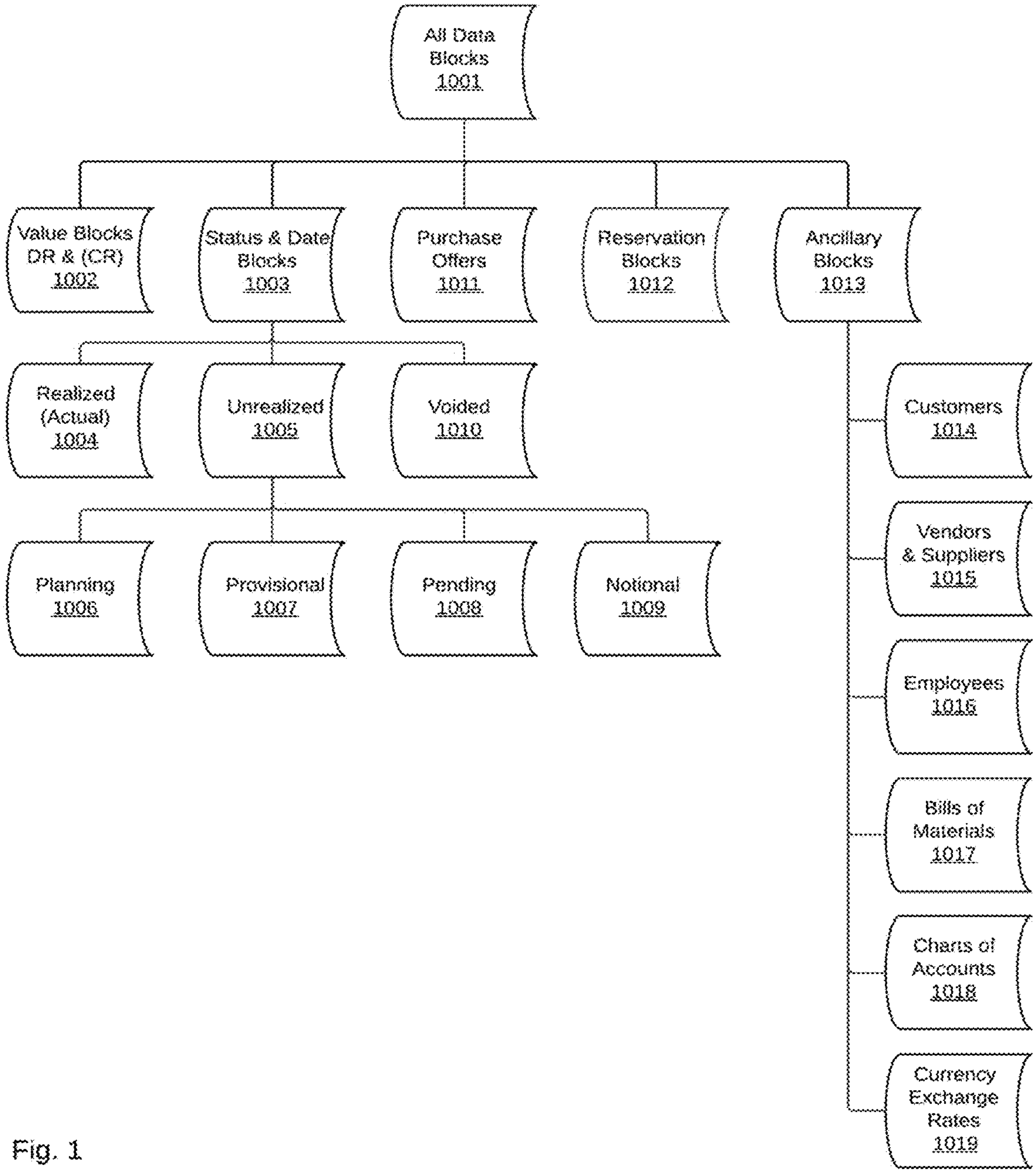
FIG. 1 is an organizational chart of the hierarchy of blocks in the distributed ledger.

The method and process of the present invention automates the posting of financial accounting journal entries and underlying value blocks 1002 by executing smart contracts in phases. The first phase is a transaction, defined in the present invention as a negotiated purchase and sale between a buyer and seller in which the triggering event is the buyer's purchase offer 1011 in the form of a data block in the distributed ledger. The purchase offer 1011 may be extramural 1023 or intramural 1027. The purchase offer 1011 comprises two components: (a) Transaction hypotheses: the purchase offer terms desired including: the resource (asset or service) to be purchased; the quantity; the price; the credit terms; and, the delivery timing required or requested; and (b) Method of Accounting Hypotheses: all information required for the buyer to record the asset or resource according to various methods of accounting through the expensing, sale or other disposition of the asset or resource once the transaction is complete and the asset is placed in service. The purchase offer 1011 is introduced to the seller's smart legal contract 1024 in which the buyer's terms are the hypotheses in a series of conditional statements in an evaluating 1034 smart contract to determine if the seller can fulfill the sale as requested at a satisfactory price. The seller's evaluating smart contract 1034 initiates a series of cascading intramural transactions 1027 which follow the bill of process 1028 for the specific asset or resource in the purchase offer. As each downstream transaction executes, the intramural seller function evaluates 1034 the intramural purchase offer 1011 terms and timing required. If the downstream intramural sellers cannot fulfill the purchase offer 1011 terms, then the downstream seller(s) counter offer amended purchase offer terms that can be fulfilled. Once all downstream sellers have either accepted the upstream purchase offer terms or have amended such terms that can be fulfilled, the originating, extramural evaluating 1024 smart contract either accepts the extramural buyer's purchase offer terms, or counter offers amended terms in a negotiation loop. If the sales smart contract 1024 accepts the buyer's terms, then the journal entry value blocks (debits and credits) 1002 and reservations 1012 are locked in by an updating smart contract 1035 from 'planning" status 1006 to "provisional" 1007. As the sale is fulfilled according to the bill of process 1028, the seller's provisional entries 1007 are realized 1004 (updated 1035 to "actual" status 1004) and the entries and reservations become the historical record in the distributed ledger. As the transaction is completed and the buyer receives the asset or resource purchased in which the asset or resource is realized 1004, the buyer executes accounting method 1030 smart contracts to generate prospective, provisional 1007 entries which either capitalize or expense the asset or resource according to the methods of accounting.

FIG. 1 "Hierarchy of Data Blocks" depicts the present invention's data hierarchy, in which all data items are maintained and stored in blocks within a distributed ledger. While many terms in the present invention use terms and definitions from legacy accounting systems, such as "journal entries" even though there are no journals or ledgers in the present invention, there are other terms that are not common in legacy systems. 1001: Population of all blocks in the distributed ledger. 1002: "Value blocks" are the backbone of the distributed ledger and represent the distributed ledger accounting debits and credits. Since there are no databases or ledgers, the entire structure of the distributed ledger data is defined by the fields within the record blocks. Value blocks relate to other value blocks by the internal fields. The fields within the Value blocks contain identical fields of data such as: the debit/positive or credit/negative value amount in the base currency; foreign currency equivalents; a block serial number; the company identification number; the company division; location; SEC taxonomy chart of accounts number and account name; the corresponding IFRS account number and account name; the company's alias account number and name; other companies under common control (related parties); the source smart contract that generated the block; and, a distributed ledger entry description. 1003: Unlike legacy accounting systems in which all journal entries are posted to the general ledger, the present invention distinguishes entries between realized (or "Actual" historical entries) 1004 and unrealized 1005 (prospective) entries that are projected to be realized in the future. Each value block in the distributed ledger has a corresponding "Status & Date" block, which are updated as the unrealized entries and blocks are realized. In addition to value blocks, reservation 1012 blocks also have a status. 1004: "Actual" status blocks are realized; that is, are finalized and are posted to the company's historical financial records. 1005: Unrealized entries and reservations are prospective entries used in the present invention method for planning and forecasting. 1006: "Planning" status entries and reservation blocks are evaluation (purchase offer transaction pre acceptance) blocks. The Evaluating 1034 smart contract generates Planning blocks for all entries and reservations in the negotiation cycle according to the Bills of Process 1028 If the Evaluating 1034 smart contract accepts the Purchase Offer, then an Updating 1035 smart contract changes the Planning 1006 status to Provisional status 1007. If the buyer's Purchase Offer 1011 and subsequent counteroffers are rejected, the Planning blocks are Voided 1010. Operators evaluate Planning-Voids over time to determine additional resources the enterprise requires to fulfill all purchase offer transactions. If an Evaluating smart contract runs multiple iterations of the negotiation cycle to propose a counteroffer to the potential buyer, the evaluating smart contract overwrites the planning entries and reservations until the purchase offer is accepted and then updates Planning entries and reservations to Provisional. 1007: "Provisional" entries and reservations are unrealized, prospective entries/reservations that are projected to be realized at a date in the future. 1008: "Pending" status blocks are past-due provisional blocks. That is, if a provisional entry had been planned and expected to occur and be realized as part of a production run, but the production run was postponed, then the provisional blocks are updated to "pending" 1008. Likewise, if a provisional 1007 cash receipt was not received by the expected date, then the provisional cash receipt is updated to pending status. Operators analyze the lag time between provisional 1007, pending 1008, and, actual 1004 statuses to adjust the bills of process 1028. 1009: Operators post "Notional" status blocks to forecast pro forma financial statements that show hypothetical results. Notional-status entries may be single journal entries or all transaction entries relating to Notional Purchase Offers 1011. 1010: "Voided" status entries will never be realized. Example 1010-A: if equipment is sold prior to realizing all future provisional depreciation expense entries, then all post-sale depreciation expenses are voided. 1011: "Purchase Offers" blocks are a buyer's initial input into the distributed ledger and comprise a set of conditional statement hypotheses (purchase offer terms) that describe: the resource (asset or service) to be purchased; the quantity; the price; the credit terms; and, the delivery timing required or requested. The buyer's Purchase Offer hypotheses are introduced to the seller's Evaluating 1034 smart contract to determine if the seller can accept the hypotheses. If the seller is unable to accept the hypotheses, the seller's Evaluation smart contract counter offers by proposing amendments to cure the unacceptable hypotheses. If the seller's counteroffer is acceptable, the buyer will amend the original Purchase Offer 1011 and re-introduce the hypotheses to the seller's Evaluating smart contract. If the buyer is unable to accept the seller's counteroffer, then the buyer will reject the counteroffer, which terminates the transaction. In addition to the purchase offer terms that the buyer proposes to the seller, the purchase offer also contains a complete description of the asset or resource to be purchased for the buyer to base the method of accounting adjustments 1030 once the transaction is complete and the buyer places the asset into service or expenses (consumes) the resource. The operator chooses the purchase offer by category of asset or resource, which are tailored to the specific asset or resource acquired. That is, if the buyer was issuing a purchase offer for equipment, then the asset information to account for the equipment under GAAP would include: the equipment category; the useful life; the salvage value; depreciation method and convention to be applied. If other methods of accounting, income tax method of accounting for example, requires additional information, then the purchase offer would also include: the company's ability to immediately expense the asset under section 179 of the Internal Revenue Code; Modified Accelerated Cost Recovery System (MACRS) class, recovery period, and the percentages to be deducted over the life of the equipment. Finally, a purchase offer may also be notional 1009, in which a selling operator introduces a purchase offer 1011 to the distributed ledger that has not been received from an extramural buyer but is projected to be received in the future from an indeterminate buyer. The operator then evaluates resources necessary for the enterprise to project capacity to fulfill the notional sale(s). Notional purchase offers generate notional 1009 status entries 1002 and reservations 1012 and are voided with the passing of time or receipt of an extramural buyer's purchase offer that replaces the notional purchase offer. Note that extramural purchase offers are evaluated without regard to notional purchase offers. That is, if the enterprise receives an extramural purchase offer, the notional purchase offers/sales do not impair the availability of resources or the ability of the enterprise to fulfill the extramural purchase offer. Example 1011-A: (a) An operator may project a notional sale in six months from an indeterminate buyer. (b) The extramural notional purchase offer is input into the distributed ledger and all downstream intramural transactions are evaluated by following the Bill of Process 1028. (c) The operator generates forecasts and projections based on extramural and notional purchase offers to determine any additional resources that will (or may) be required. (d) Once the six months elapses or a valid extramural purchase offer is received, the notional purchase offer is voided. 1012: Scheduling 1036 smart contracts generate "Reservation" blocks, which are: date, time, and duration. Reservations are attached to a resource in the Purchase Offer Evaluation 1034 process. Reservations follow the same status path as a Value 1002 blocks (Planning 1006; Provisional 1007; Pending 1008; Actual 1004) and can be Notional 1009 or Voided 1010. Reservation 1012 blocks cannot overlap for a resource. That is, a resource cannot be reserved for the same date, time, and duration (double booked). Example 1012-A: (a) Finished Goods Inventory issues a Purchase Offer to the Shipping Department via a Scheduling 1036 smart contract to physically transport goods to an external buyer. (b) The Scheduling 1036 smart contract generates planning-status Reservation 1012 blocks for a truck in its fleet. If there are no conflicting reservation blocks, then the Scheduling 1036 smart contract accepts the Purchase Offer 1011 and updates the Reservation to Provisional 1007, which locks in the date, time, and duration. (c) Once the truck delivers the goods to the buyer, the Scheduling smart contract realizes the Reservation 1012 block updating the reservation to Actual 1004 status. 1013: "Ancillary" blocks are all related lists and information required to complete a transaction, such as: approved Customers 1014 lists and related information; Vendor & Supplier 1015 lists and related information; Employees 1016 and payroll-processing information; Bills of Materials 1017; Charts of Accounts 1018; and, daily foreign currency Exchange Rates 1019.

Figure 2:
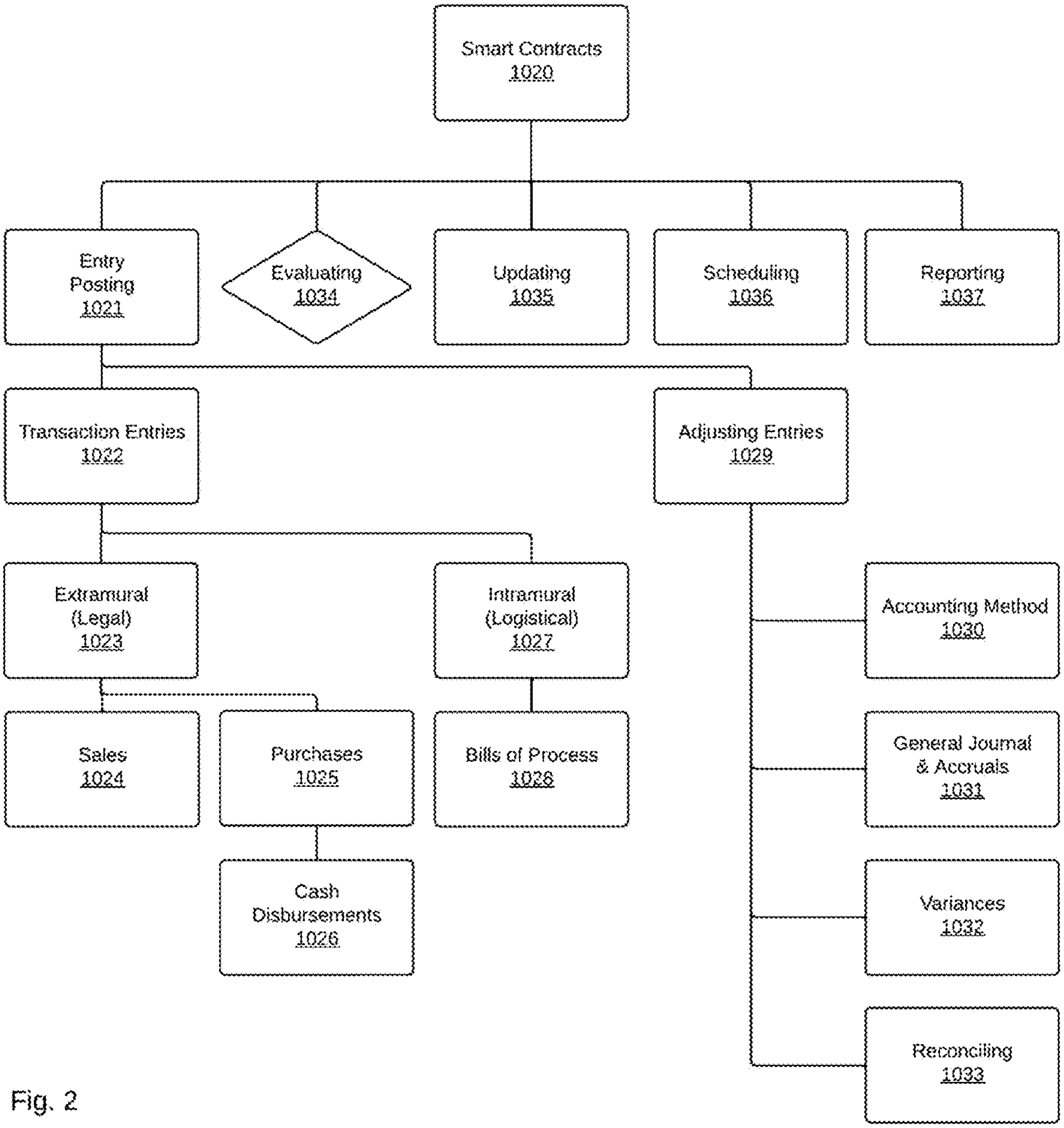
FIG. 2 is an organizational chart of the hierarchy of smart contracts in the distributed ledger.

FIG. 2 "Hierarchy of Smart Contracts" depicts the present invention's smart contracts that automate journal entry compilation, evaluate conditional statements, update block statuses, schedule resources, and generate reports. 1020: Population of all smart contracts executed in the present invention. 1021: Entry Posting smart contracts generate series of blocks whose values sum to zero to reflect financial transactions 1022 or adjust balances 1029. 1022: The present invention defines transactions as a buyer's purchase or acquisition of an asset or other enterprise resource, and a seller's fulfillment of the sale. As such, the Transaction Entry smart contracts generate the journal entries to reflect the purchase/sale. Transactions may be either extramural 1023 or intramural 1027. Transactional smart legal contracts record entries to reflect extramural offer acceptance smart (legal) contracts and fulfillment (delivery or performance), whereas intramural transactions are logistical. That is, while both extramural 1023 and intramural 1027 transaction smart contracts perform the same offer acceptance fulfillment cycle, the extramural 1023 transactions are binding legal contracts. Whereas intramural 1027 transactions represent the acquisition and timing of resources by one department or function from another within the enterprise. 1023: "Extramural" transaction smart contracts execute a legally binding purchase contract initiated by an external buyer, which is a sale 1024 transaction from the perspective of the company, or a legally binding purchase contract initiated by the company to an external vendor or supplier 1025. 1024: Sales transaction smart legal contracts execute the negotiation initiated by an extramural buyer (offeror) to a willing seller (offeree). In this case, the company operating the present invention is the offeree. 1025: Purchase transaction smart legal contracts execute the negotiation initiated by the company operating the present invention to a willing extramural seller (offeree). 1026: Cash Disbursement smart contracts require an Operator's specific authorization. Purchase transaction smart contracts generate Provisional Cash Disbursements (debit Cash and credit Accounts Payable) on an expected date based on the Purchase Offer terms. Operators set a cash disbursement schedule, which executes automatically to pay vendor invoices based on the payment terms. If the operator defers payment past the Provisional invoice payment date, the Updating smart contract 1035 changes the status to Pending. Example 1026-A: (a) The Operator establishes Wednesdays as the weekly cash disbursement day for routine payments. (b) Every Wednesday, the system executes the Cash Disbursement smart contract, which: (c) Reconciles 1033 the system cash balances with the bank data. (d) Executes a Cash Flow Forecast 1037 reporting smart contract for Provisional and Pending cash receipts and disbursements; and (e) Executes an Accounts Payable Aging 1037 reports smart contract. (f) The Cash Disbursement smart contract sends an alert to an operator to review and approve disbursements. (g) The authorizing Operator reviews the reports provided and determines which invoices to pay, and which to defer. (h) For any disbursements above the authorizing operator's signature authority, the Cash Disbursement smart contract sends an alert to a higher-level authorizing Operator. (i) Once Operator(s) authorize or affirmatively defer all disbursements, the Cash Disbursement smart contract creates an Electronic Funds Transfer (EFT) upload file and issues the EFT file to the bank that disburses the funds. (j) The daily Bank Reconciliation 1033 smart contract gathers the banking activity the following day and the Updating 1035 smart contract changes the status of all payments cleared from Provisional 1007 or Pending 1008 to Actual 1004. Note that while cash disbursements require an operator's specific authorization through the Cash Disbursement process, sales 1024 transaction smart contracts generate Provisional Cash Receipt entries based on the Purchase Offer terms. The Bank Reconciliation 1033 smart contract updates Provisional 1007 and Pending 1008 Cash Receipts entries to Actual upon receipt. Finally, the intramural transaction 1027 smart contracts do not generate cash receipt or disbursement entries. 1027: Intramural smart contracts execute the purchase-sale of assets or resources from departments or company functions to another following the Bill of Process 1028 that cascade through the company in the fulfillment cycle. Example 1027-A: (a) The sales function receives a purchase offer 1011 from an external buyer in an extramural transaction 1023. (b) The sales function executes an intramural purchase offer 1011 to the finished goods inventory. (c) if the finished goods inventory has the item quantity on hand, then the finished goods inventory accepts the sales function' offer, and issues a purchase offer to the shipping function. (d) The shipping function schedules 1036 a reservation 1012 for a truck and issues a purchase offer to the human resources function to schedule a driver. (e) The human resources function accepts the purchase offer and schedules a driver by issuing a reservation 1012. (f) The driver fulfills the reservation by delivering the finished goods to the external buyer. 1028: Bills of Process (also referred to as a "Production Order" herein) smart contracts detail specific steps, intramural 1027 transaction smart contracts, and the planned production approach for a product or service to either manufacture goods or the specific steps and requirements to provide a service to a customer. The bill of process lists all resources required including direct labor, tools, machines, and equipment needed to make the product or service along with timing and duration of each step. 1029: All journal entries that are not necessitated by transactions 1022 are considered Adjusting Journal entries. 1030: Transaction 1022 smart contracts generate entries common to all accounting methods. Once the transaction is complete, and the asset or resource is received or placed in service, Accounting Method 1030 smart contracts generate adjusting entries to record entries by executing pre-defined smart contracts that follow the accounting method for that particular asset or resource. If the accounting method allows alternative accounting treatment, the system chooses the option that most clearly achieves the goal of the accounting method. Example 1030-A: (a) Under US GAAP, a construction company with long term contracts must adjust revenues at month end to match the percentage of the contract that has been completed (the Percentage of Completion revenue recognition method) as opposed to recognizing revenue when a client invoice is issued. (b) At month end, the Accounting Method 1030 Adjustment smart contract sums the project to date Actual costs and divides the sum by the project budget to derive the percentage of completion. (c) The Accounting Method 1030 Adjustment smart contract applies the percentage of completion to the construction contract value(s) to determine project revenue earned. (d) The Accounting Method 1030 Adjustment smart contract subtracts the revenue recognized to the prior month. (e) The Accounting Method 1030 Adjustment smart contract adjusts the current month revenue against the "under billed" asset or the "over billed" liability. Example 1030-B: (a) Under US GAAP, the cost of plant and equipment is capitalized as a long-lived asset and then expense over the useful life of the asset through depreciation. on a straight-line basis to match the revenue generated by the asset. (b) Using information in the original purchase offer 1011, the method of accounting smart contract computes the straight-line depreciation per month over the life of the asset. (c) The accounting method 1030 smart contract then generates provisional 1007 journal entries for all future monthly depreciation expenses scheduled to be realized on the first day of each month. (d) On the first day of the month, the updating 1035 smart contract realizes the expense, changing the status from provisional 1007 to actual 1004. Example 1030-C: (a) Under US GAAP, a company must spread the cost of a long-term software subscription evenly over the contract term, even though the cost per year changes during the life of the contract (See FIG. 23). Example 1030-D: (a) The enterprise is taxed at the corporate level. US GAAP requires companies to record book to tax timing differences as current and non-current tax assets and liabilities. (b) The Accounting Method 1030 Adjusting entry smart contract adjusts the tax assets and liabilities against the income tax expense at month and year end (see FIG. 25). Example 1030-E: (a) Under US GAAP method of accounting, the Accounting Method 1030 Adjusting entry smart contract applies management-determined percentages to aged customer invoices outstanding to estimate the allowance for doubtful accounts receivable. (b) Management's pre-determined allowance percentages are: 100% of outstanding invoices older than 180 days; 40% of outstanding invoices from 121 to 179 days old; and, 5% of outstanding invoices from 91 to 120 days old. (c) Once the Adjusting smart contract applies the percentages to outstanding invoices, the smart contract posts an adjusting entry to reverse the current allowance for doubtful accounts in full and records the current balance. Example 1030-F: (a) Under the US Tax method of accounting, the IRC allows a company to deduct the cost of equipment over time using the MACRS percentages applied to the cost of equipment, or, alternatively, immediately deduct the cost of the equipment with annual maximums under IRC § 179. (b) Since the tax method of accounting allows for alternate treatment, the system defers to the tax-method goal of accelerating deductions. (c) The Accounting Method 1030 Adjusting entry deducts the entire cost under § 179. 1031: Operators execute General Journal, Accruals and Reversals smart contracts to post routine adjustments to the distributed ledger. The accruals are automatically posted to the distributed ledger at month end and then reversed in the following month post-closing. While an Operator must apply judgment to determine accruals, Accrual & Reversal smart contracts compute the accruals based on prior period accruals as well as monitoring expense fluctuations when compared with the expenses in prior periods. Example 1031-A: (a) "Shop Supplies" expenses have averaged $10K over the twelve trailing months but are $2K in the current month. (b) The Accrual & Reversal smart contract generates an accrual entry to record an additional $8K Shop Supplies estimated expense and prompts the Operator to validate the proposed accrual. (c) The Operator approves the accrued expense. (d) The distributed ledger receives Shop Supplies vendor invoices the following month. (e) The Accrual & Reversal smart contract generates a reversing entry for US $8K. 1032: Unrealized 1005 entries are based on estimates or budgets within the bills of process 1028. As these unrealized 1005 entries are realized and updated to actual 1004 status, the Variance 1032 adjusting smart contract generates an entry for the difference in the same way as budget-to-actual variances are manually adjusted in legacy system. Example 1032-A: (a) An intramural transaction 1027 smart contract purchases direct labor from Human Resources for a machine operator based on the Bill of Production 1028. (b) Human Resources generates a Scheduling 1012 block which reserves the employee's time. (c) Human Resources generates a provisional 1007 entry to the production order for the cost of the employee's time based on the budgeted hours in the Bill of Production 1028 and the employee's hourly pay rate. (d) When the employee records their time to the work order, the Variance 1032 adjusting smart contract generates an entry for the unrealized-to-realized (budget-to-actual) difference. Example 1032-B: (a) Management establishes guidelines for purchase offer 1011 variances (to invoiced amounts). (b) if an original Purchase Offer 1011 issued to a vendor is $10K or less and the final invoice is within one percent greater and two percent less than the purchase offer, then the Variance 1032 smart contract adjusts the purchase offer 1011 to the invoiced amount. (c) If an original Purchase Offer 1011 is between $10,001 and $100K and the amount invoiced is one half percent above or one percent below the Purchase Offer 1011, then the Variance 1032 smart contract adjusts the Purchase Offer 1011 to the amount invoiced. (d) Otherwise, the Variance 1032 smart contract alerts an operator to investigate and resolve the difference. 1034: Evaluating smart contracts test the Purchase Offer 1011 hypotheses (terms) in the negotiation cycle between a prospective buyer and seller in transaction smart contracts, both legal (extramural) 1023 and logistical (intramural) 1027. The Evaluating 1034 smart contracts follow the Bill of Process/Production 1028 process steps starting with the primary Evaluating 1034 smart contract (the extramural transaction 1024) and then cascade through the successive intramural 1027 transactions through delivery. The Evaluating 1034 smart contracts determine the seller's ability to fulfill the Purchase Offer 1011 by testing the hypotheses. If none of the downstream intramural 1027 Evaluating 1034 smart contracts counteroffer the hypotheses, then the primary Evaluating smart contract accepts the extramural Purchase Offer 1011. Downstream Evaluating 1034 smart contracts must counteroffer (that is, intramural sellers cannot reject) the intramural Purchase Offer 1011. If a downstream Evaluating 1034 smart contract counteroffers, then the amended hypotheses are cycled through upstream transactions and reiterate through the Evaluating 1034 smart contracts until all intramural Evaluating 1034 smart contracts accept the original, extramural Purchase Offer. Evaluating 1034 smart contracts generate Planning 1006 entries and reservations 1012 for the transactions through delivery. If the primary evaluating 1034 smart contract accepts the buyer's Purchase Offer 1011, the transaction Planning 1006 entries are converted to Provisional 1007, and triggers the actions necessary to perform the contract terms or deliver goods according to the Bills of Process 1028. The buyer controls the Purchase Offer 1011 and can decline counteroffers. If a Buyer declines all counteroffers, the transaction terminates, and all Planning 1006 entries and reservations are voided 1010. The operator periodically reviews Planning-Voids 1010 to determine if additional resources are required in the future to avoid buyers terminating transactions in the negotiation cycle. Example 1034-A: (a) An external buyer issues a Purchase Offer 1011 to the company for 1,000 widgets at the company's list price for immediate delivery. (b) The company (seller) Evaluating 1034 smart contract determines the quantity on hand. (c) If the widget inventory on hand is greater than or equal to 1,000, the Evaluating 1034 smart contract accepts the Purchase Offer 1011 and delivers the widgets to the buyer. Example 1034-B: (d) If 600 widgets are on hand, but the remaining 400 widgets will be available in two weeks, the Evaluating 1034 smart contract counteroffers the 600 widgets to be delivered immediately but deliver the remaining 400 widgets in two weeks. (e) The Buyer evaluates the counteroffer and accepts the amended Purchase Offer 1011 terms. (f) The seller's Evaluating smart contract accepts the amended Purchase Offer 1011 in the distributed ledger and updates the Planning 1006 entries 1002 and reservations 1012 to Provisional until delivery. Example 1034-C:(g) The Buyer evaluates the counteroffer (d) and accepts the 600 widgets on hand but declines the delivery of 400 in two weeks. (h) The Evaluating smart contract counteroffers 400 widgets to be delivered in two weeks at a 5% discount. (i) The Buyer evaluates and declines the discounted 400 widgets and terminates the transaction. (j) The Evaluating smart contract updates the entries and reservations for the 600 widgets on hand to Provisional 1007 and Voids 1010 the Planning 1006 entries 1002 and reservations 1012 for the 400 widgets declined. 1035: "Updating" smart contracts change the status & date of a Planning 1006 entry 1002 to Provisional 1007 when an Evaluating 1034 smart contract accepts a Purchase Offer 1011; Provisional 1007 to Pending 1008 if the expected (Provisional 1007) date passes; and from Provisional 1007 or Pending 1008 to Actual 1004 when the transaction entry is realized. Example 1035-A: (a) A sale transaction 1024 smart legal contract generates an entry 1002 to record a cash receipt sixty days after the system issues a customer invoice as per the terms of the Purchase Offer 1011. (b) If the seller receives the customer payment prior to the sixtieth day, then the Updating smart contract changes the status from Provisional 1007 to Actual 1004. (c) If the company does not receive the cash by the sixtieth day, then the Updating 1035 smart contract changes the status from Provisional 1007 to Pending 1008. (d) When the Pending 1008 cash receipt is received, the Updating 1035 smart contract (within a reconciling 1033 smart contract) changes the status from Pending 1008 to Actual 1004. 1036: "Scheduling" smart contracts generate reservation 1012 blocks according to Bills of Production/Process 1028 smart contract requirements. If there is already a reservation 1012 for the asset or resource, then the scheduling smart contract amends the up-stream purchase offer 1011 and counteroffers for the next available day and time with a sufficient duration. 1037: "Reporting" smart contracts gather (by summing) value 1002 blocks that meet specific criteria or set of criteria for a specific date or date range. Standard reports such as financial statements are prewritten smart contracts that sum value 1002 blocks by account from the distributed ledger based on the method(s) of accounting. Financial statements by their nature are historical (report the transactions and their effects of entries in the past). So, only Actual 1004 (realized) debit and credit blocks are summed in the preparation of (historical) financial statements. A reporting 1037 smart contract sums provisional 1007 and pending 1008 (and, potentially, notional 1009) status blocks in the preparation of cash flow forecasts and forecasted financial statements. Reporting 1037 smart contracts also produce non-financial information, such as planning calendars and Gantt charts based on Reservation blocks 1012. Example 1037-A: (a) An operator executes a balance sheet Reporting 1037 smart contract for the prior year. (b) The reporting 1037 smart contract prompts the operator to input the required information: accounting method, balance sheet date, and currency. (c) The reporting 1037 smart contract also prompts for other options that limit the information by any other fields in the value blocks such as: company divisions; departments; locations; or comparative periods (years, quarters, or months). (d) Once the operator selects the information to be included, the smart contract sums all Actual 1004 value blocks by account (Cash, Accounts Receivable, Inventory, etc.) and displays the Balance Sheet(s) in the format prescribed by the accounting method chosen. Example 1037-B: (e) Continuing with Example 1037-A, an operator may choose multiple accounting methods for comparative Balance Sheets, such as US GAAP and US Income Tax. In that case, the Reporting smart contract would execute balance sheet Reporting smart contracts from both US GAAP and Tax method blockchains. Example 1037-C: (a) During the current month, management wants to review the month to date Income Statement, and then the projected Income Statement through the end of the month. (b) In this case, the Reporting 1037 smart contract sums all Actual 1004 blocks to date and sums provisional 1007, pending 1008, and, notional 1009 blocks to the month end.

Figure 3:
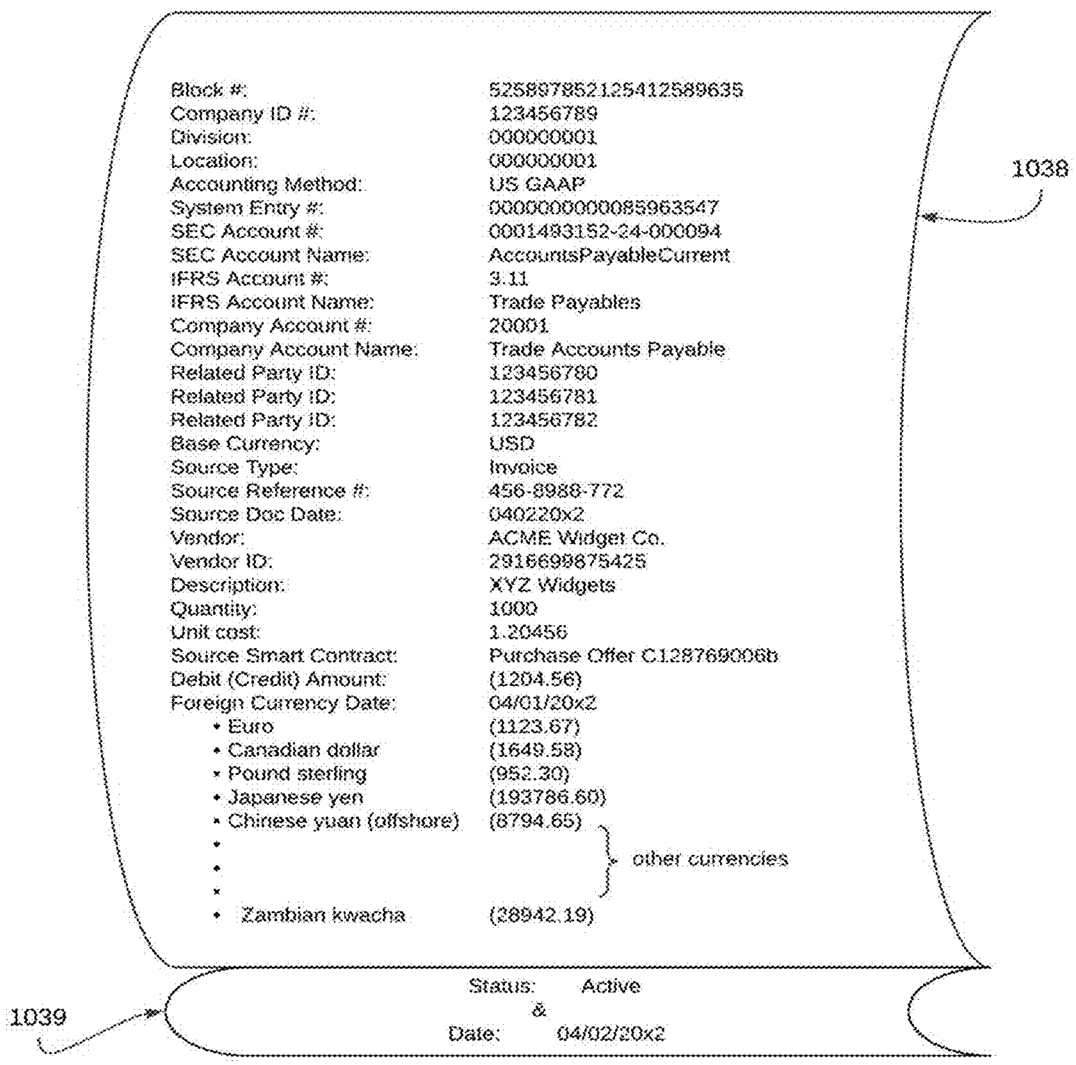
FIG. 3 is an example of value and status/date blocks in the distributed ledger.

FIG. 3 is a Sample Transaction Value Block & Status/Date Block". 1038: The sample value 1002 block depicts a record in the distributed ledger in which the fields are identical to all other value block records. Since there are infinitely many fields within each block, and the field length is infinitely many alpha-numeric characters, the method of the present invention is infinitely scalable. 1039: Each value 1002 block has an attached Status & Date 1003 block.

Figure 4:
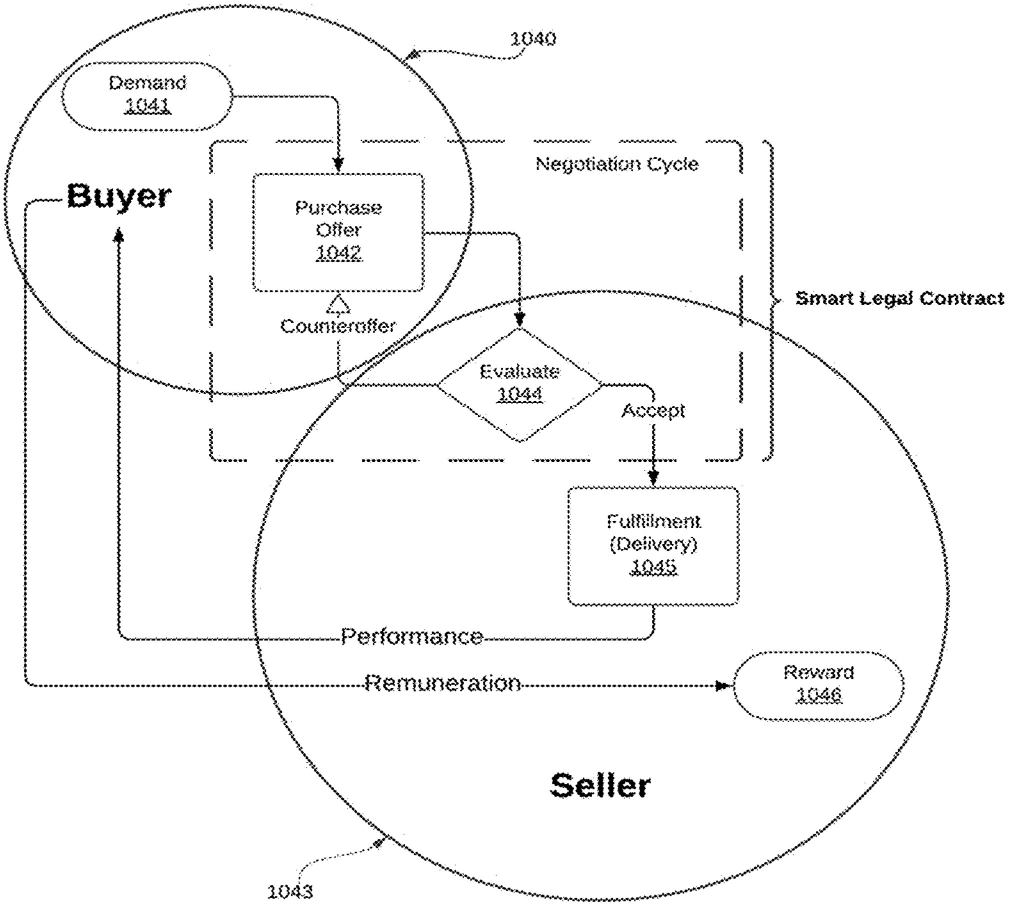
FIG. 4 is a process flow diagram of the overview of the purchase/sale transaction between an extramural buyer and seller.

FIG. 4 depicts the critical path of a smart legal contract: a potential buyer 1040 has a demand 1041 for a product or service and issues a purchase offer 1042 to a potential seller 1043. The seller 1043 evaluates 1044 the terms of the purchase offer 1042. If the seller cannot meet the terms of the purchase offer 1042, the seller counteroffers terms that are acceptable. Otherwise, the seller accepts the purchase offer 1011 terms and fulfills the purchase offer by delivering 1045 to the buyer. Once the buyer receives the goods or services ordered, the buyer remunerates the seller, rewarding 1046 the seller.

Figure 5:
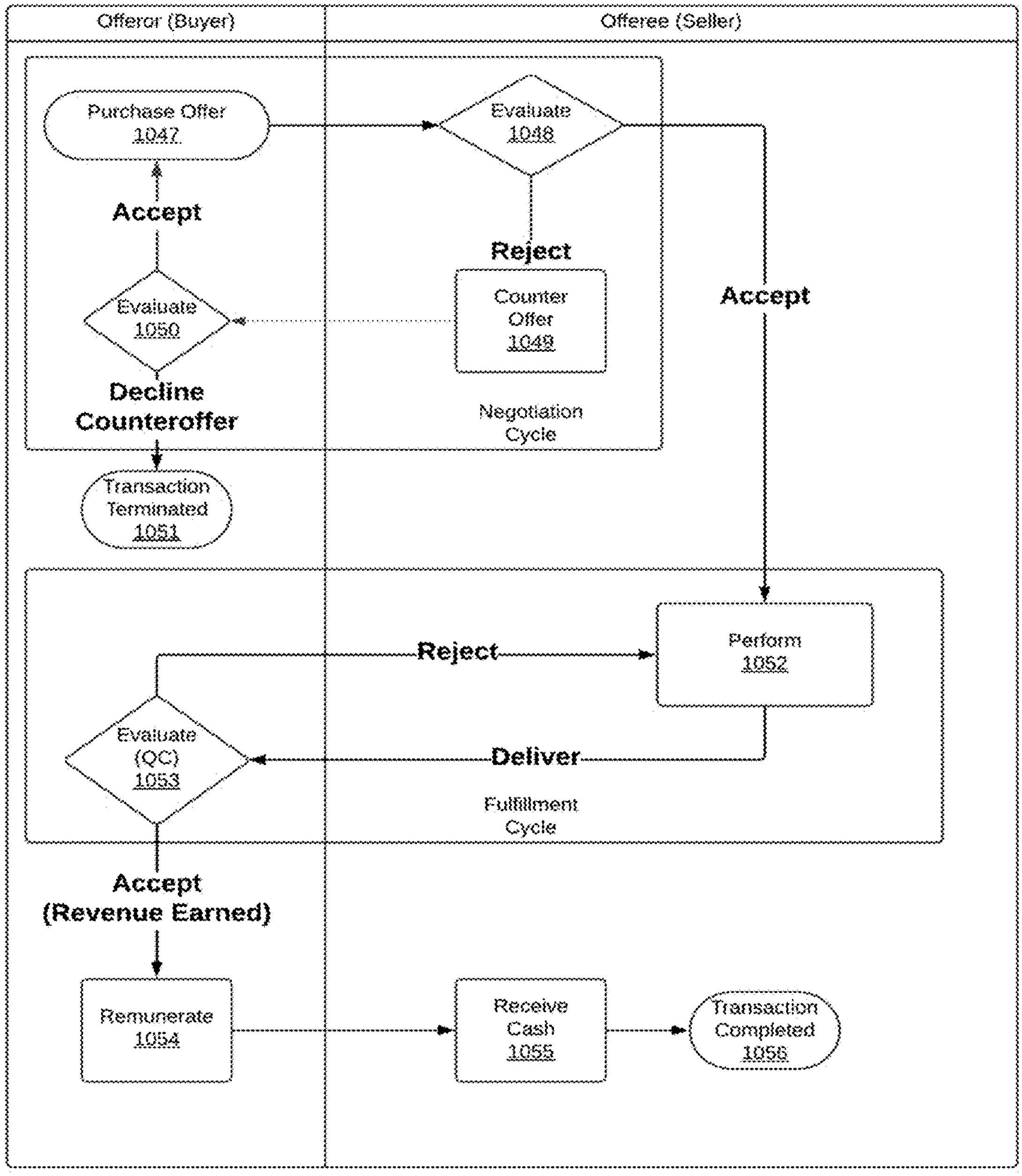
FIG. 5 is a process flow diagram of the detailed steps of a fully automated extramural transaction.

FIG. 5 depicts the overall flow diagram of fully automated transaction. 1047: The Offeror issues a Purchase Offer 1011 to the Offeree. 1048: The Offeree executes an Evaluating 1034 smart contract to test the Purchase Offer 1011 hypotheses through all downstream evaluating 1034 smart contracts following the bills of process(es) 1028. 1049: If the seller rejects the purchase offer hypotheses 1011 then the Offeree Evaluating 1034 smart contract amends the Purchase Offer 1011 to remediate the causes of downstream evaluating 1034 smart contract rejection and counteroffers amended terms. 1050: The Offeror evaluates the proposed Purchase Offer 1011 amendments counteroffered. If the proposed changes are acceptable, then the Purchase Offer 1011 is re-issued. 1051: If the Offeror rejects the counteroffers, then the transaction is terminated. 1052: If the Evaluating smart contract accepts the Purchase Offer, then the seller performs or delivers under the terms. 1053: Upon taking delivery. the buyer evaluates the services or items delivered for quality control.

If the services/items are rejected, then the offeror instructs the seller to remediate 1052. 1054: Otherwise, the buyer accepts and remunerates the seller. 1055: The seller receives payment, and the transaction is completed 1056. Example 5-A: (a) The transaction is an extramural sale 1024 transaction in which the offeror is the company's customer. The customer issues a purchase offer. (b) The Evaluating 1048 smart contract executes all cascading 1027 smart contracts to fulfill the order by following the steps, timing and requirements of the Bills of Process or Production 1028. (c) If there are sufficient company resources to fulfill the order (for example, the company has employees with available time; available machinery; and, inventory), then the Evaluating 1034 smart contract accepts the offer and the updating 1035 smart contract changes the statuses of the Entries 1002 and Reservations 1012 from Planning 1006 to Provisional 1007. (d) If there are insufficient company resources to fulfill the order, an Evaluating 1034 smart contract determines the necessary changes to the Purchase Offer 1011 for the company to fulfill the order and submits the proposed amendments (counteroffers) to the customer. (e) The Evaluating 1034 smart contract continues to run iterations of the transaction and counter offering to the Buyer. If the Buyer rejects the counteroffers, then the negotiation cycle is closed, the transaction is terminated, and the updating 1035 smart contract changes the Planning 1006 entries and reservations to Void 1010. (f) When the buyer accepts delivery, the Updating 1035 smart contract changes the revenue recognition entry 1002 (debit Accounts Receivable & credit Revenue) status from Provisional 1007 to Actual 1004.

Figure 6:
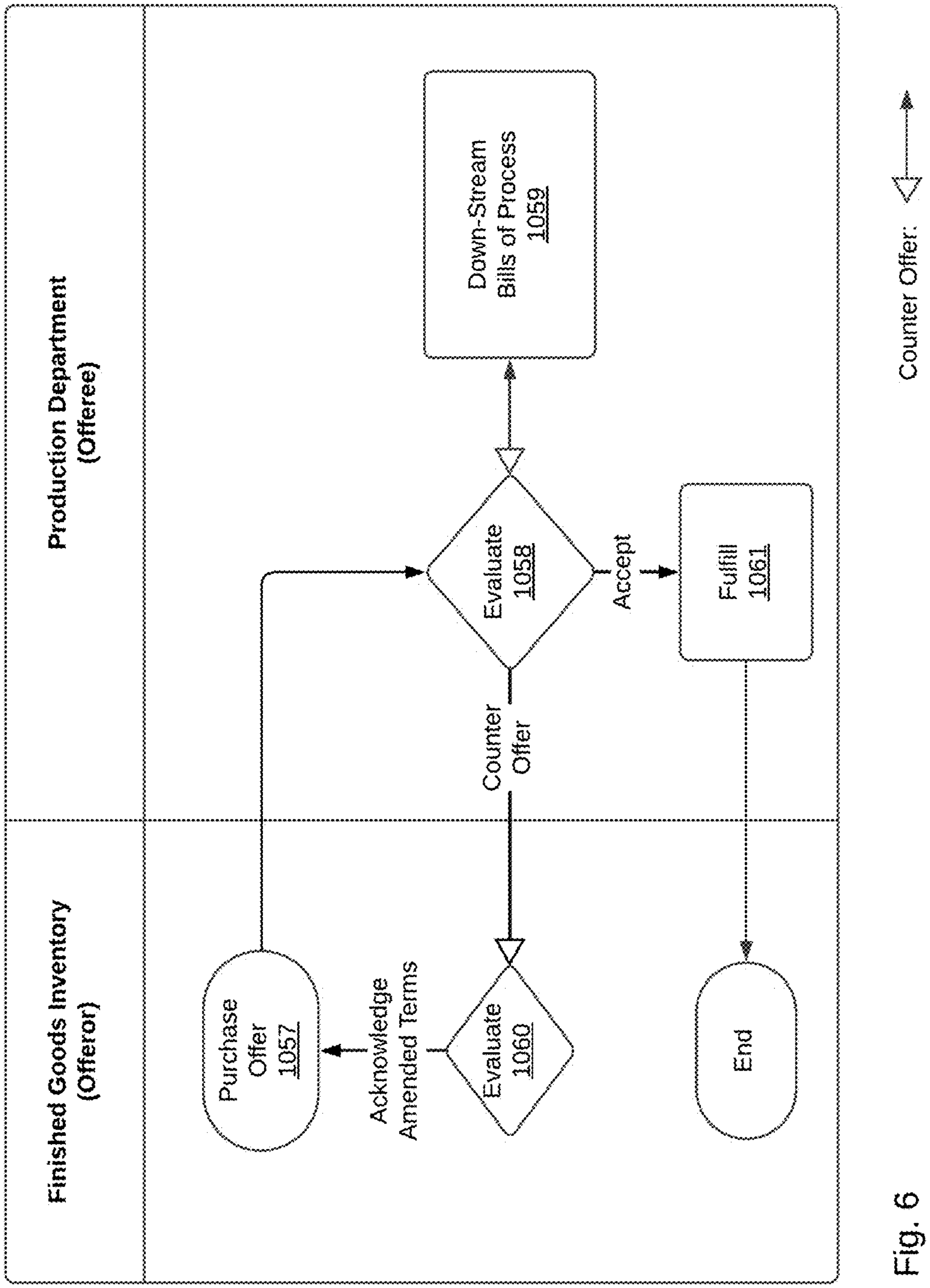
FIG. 6 is a process flow diagram of an intramural transaction between the finished goods and production functions within a company.

FIG. 6 depicts an example of intramural 1027 purchase/sale. 1057: An operator has determined a minimum inventory level, or safety stock, which is the lowest quantity of a product the company should maintain to avoid stockouts and potential sales losses due to unexpected demand or delivery delays. The finished goods inventory function issues a purchase order to the production department. 1058: The production department receives the purchase offer 1011 hypotheses and evaluates finished goods' terms. 1059: The Production department executes cascading 1027 logistical smart contracts through the downstream functions' bills of process. 1060: If the production department cannot fulfill the finished goods terms (due to timing or an inability to meet cost targets, for example), then the production department counteroffers amended terms to finished goods (which in this example may be delayed delivery or a higher-than-expected cost basis). Finished goods then evaluates the production departments revised terms, which in this case is an acknowledgement of the timing delay or higher costs. 1061: Once finished goods inventory's purchase hypotheses are accepted, the production fulfills the order and delivers the inventory to finished goods.

FIG. 7 is a table of example Balance Sheet accounts, noting the primary source smart contract: (a) Transactional 1022, or (b) Adjusting 1029. If the primary source of an account is a transaction, then offeror (buyer) and offeree (seller) are listed for both extramural 1023 and intramural 1027 transactions. 1062: Cash balances are a result receipts and disbursements of transactions. All offerors and offerees are potential parties to the transaction entry smart legal contract. No internal offerors and offerees are possible since cash does not pass between departments or functions. 1063: Trade Accounts Receivable is a function of the accrual method of accounting and represents revenue earned but is yet to be collected. 1064: Allowance for Doubtful Accounts is a contra asset of Trade Accounts Receivable and is a function of the accrual method of accounting. The aggregated accounts receivable and allowance represent management's estimate of the true (net) value of the asset. 1065: Manufactured Finished Goods (MFG) result from intramural 1027 purchases from the production function (Work in Progress inventory) at the conclusion of the manufacturing process. 1066: Purchased Finished Goods (PFG) result from extramural purchases from vendors or providers. 1067: Work in Progress (WIP) inventory is the result of internal production smart contract transactions. For example, Work in Progress purchases Raw Materials (from the Raw Materials inventory), Direct Labor (from Human Resources, which purchases from employees), and Overhead (from all indirect cost functions and departments). 1068: Raw Materials (RM) inventories are purchased through extramural transactions. 1069: Allowance for Obsolete Inventory is a contra asset of Inventories and is a function of the method of accounting. The allowance represents management's estimated offset to the inventory carrying value. 1070: Prepaid Expenses are a function of the accrual method of accounting and represent cash disbursements for which the liability has yet to accrue (and, expense). 1071: Property, Plant and Equipment are acquired in extramural transaction. If constructed internally, then the plant and equipment would follow the same intramural purchase path as manufactured finished goods. 1072: Accumulated Depreciation and the related Depreciation Expense are a function of the method of accounting and represent the systematic matching of the cost of the assets against the revenue generated by the assets over the assets' useful lives. 1073: Notes Receivable are purchased from an external debtor (usually a customer) in an extramural purchase transaction or as part of the initial purchase offer. 1074: Intangible Assets and Investments are a function of an extramural purchase transaction (usually an asset purchase acquisition in which the purchase price paid cannot be fully allocated to the net assets by adjusting them to fair market value, which creates the intangible asset Goodwill). 1075: Tax Assets (and Tax Liabilities 1080) are a function of GAAP and represent the current and non-current GAAP ("book") to Tax timing differences, which are offset against the Income Tax Expense 1108. 1076: Trade Accounts Payable are a function of the accrual method of accounting and represent a liability (and underlying expense) incurred but not yet paid. 1077: Credit Card liabilities are a function of the accrual method of accounting and represent a liability (and underlying expense) incurred but not yet paid. 1078: Accrued Payroll is a function of the accrual method of accounting and represents an accrued liability (and underlying payroll expense) incurred but not yet paid. 1079: Deferred Revenue is a function of the accrual method of accounting and represents cash received prior to earning the underlying revenue. 1080: Tax Liabilities are a function of GAAP and represent the current and non-current GAAP ("book") to Tax timing differences, which are offset against the Income Tax Expense 1108. 1081: Notes Payable—Borrowed is a function of an extramural purchase transaction with a bank or lender (buyer) in which the lender purchases an asset, which, conversely, is a debt from the offeree's perspective. 1082: Notes Payable-Repaid is not technically a separate account but listed to demonstrate that the loan (note payable) repayment is a function of the company's extramural purchase transaction in which the company buys back its debt from the lender at a premium (interest charged). 1083: Bonds payable are analogous to notes payable, but are debt owed to investors rather than a lender, per se. 1084 & 1085: All forms of company Equity (except for Retained Earnings) are a function of an extramural purchase transaction in which the investors purchase ownership. 1086: Retained Earnings is the cumulative profits or losses of the enterprise and results from both extramural transactions 1023 and adjusting entries 1029.

FIG. 8 is a table of example revenue and expense accounts, noting the primary source smart contract: (a) Transactional 1022, or (b) Adjusting 1029. If the primary source of an account is a transaction, then offeror (buyer) and offeree (seller) are listed for both extramural and intramural transactions. 1087: Revenue is earned through extramural sales 1024 transactions with a buyer or customer. 1088: Sales discounts are a function of an Accounting Method 1030 adjustment entry to revenue. 1089: Cost of Goods Sold is a result of extramural sales 1024 transactions in which a buyer or customer purchases inventory from Finished Goods. 1090: Salaries and Wages are the result of extramural 1025 transactions in which the Human Resources (HR) function purchases direct and indirect labor from employees. 1091: Payroll Tax expenses are the result of extramural 1025 transactions in which the Human resources (HR) function purchases "compliance" from taxing authorities. 1092: Employee Benefits expense is the result of extramural 1025 transactions in which the human resources (HR) function purchases benefits from a benefit provider (such as insurance or 401(k) plans). 1093: Rent and Utilities expenses are a function of extramural 1025 purchase transactions in which the facilities function purchases space from a lessor and utilities from a public utility company. 1094: Software Licenses expense is a function of extramural 1025 purchase transactions in which the Information Technology department purchases the rights to use software from a software vendor or developer. 1095: Office Expenses and Supplies result from extramural 1025 purchase transactions in which the Overhead function purchases various supplies from external vendors. 1096: Accounting Services expense result from extramural 1025 purchase transactions in which the Finance Function purchases audit or other accounting services from a provider (such as the company's independent accountant). 1097: Legal Services expenses result from extramural 1025 purchase transactions in which the Management Function purchases general counsel services from the company's Attorneys. 1098: Insurance Expense results from extramural 1025 purchase transactions in which the Management Function purchases insurance contracts from the company's insurance broker/provider. 1099: Bank Charges and Fees expense results from extramural 1025 purchase transactions in which the Overhead Function purchases banking service contracts from the company's bank. 1100: Advertising Expense results from extramural 1025 purchase transactions in which the Sales & Marketing Function purchases advertising campaign services from the company's advertising agency. 1101: Warehousing and Storage Expense results from extramural 1025 purchase transactions in which the Facilities Function purchases warehousing services from the company's warehouser. 1102: Freight/Shipping Expense results from extramural 1025 purchase transactions in which the Shipping & Receiving Function purchases transportation from the company's common carrier/trucking company. 1103: Bad Debt Expense is a result of a method of accounting adjustment (US GAAP & IFRS) to the Allowance for Doubtful Accounts. 1104: Interest Expense results from extramural 1025 purchase transactions in which the Finance Function purchases the company's debt (Note Payable) from the company's lender. 1105: Depreciation Expense is a result of a method of accounting adjustment against the Accumulated Depreciation account. 1106: Obsolete Inventory Expense is a result of a method of accounting adjustment to offset Inventory against the Inventory Obsolescence contra asset. 1107: Interest or other investment income is a result of a transaction 1025 in which the internal finance function is the buyer, and the external borrower or investee is the seller. 1108: Income Tax expense is affected by both adjusting entries and an extramural 1023 transaction. Under the Income Tax accounting method, the company determines the tax liability and underlying expense for the period in which the company is purchasing "compliance" from the taxing authority. This liability computed under the Income Tax method of accounting is then adjusted as required by the method of accounting, in this case US GAAP, for book tax timing differences, primarily the timing of an expense versus when the expense is an allowable deduction to compute taxable income.

Figure 9:
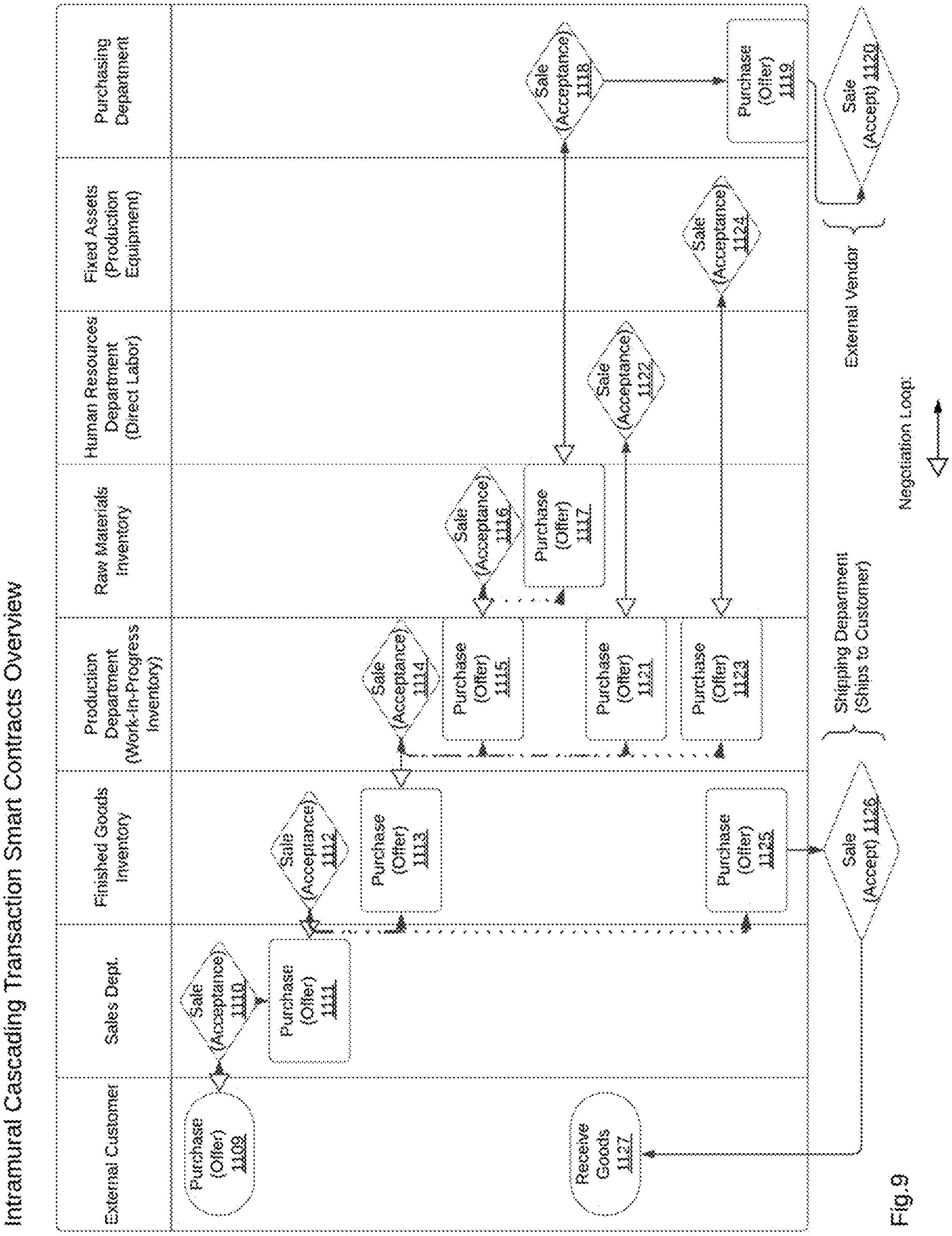
FIG. 9 is a process flow diagram of an extramural transaction that leads to cascading intramural transactions from the initial purchase offer to the delivery of goods to the buyer.

FIG. 9 depicts an example of a cascading Bill of Production 1028 in a department-to-department transaction smart logistical 1027 contract process assuming all downstream transactions are accepted or successfully negotiated. 1109: The external buyer issues a purchase offer 1011 to the Sales Department of the company. 1110: The Sales Department negotiates the terms (hypotheses) of the Purchase Offer 1011 and accepts the smart legal contract. 1111: To fulfill the buyer's purchase offer, the Sales Department purchases from Finished Goods Inventory (FG) in a smart logistical contract. 1112: Finished Goods accepts the Sales department offer. If the quantity sold is in stock, then go to 1125. 1113: If the quantity required is not in stock, then Finished Goods offers to purchase from the Production Department (Work in Progress Inventory). 1114: Production accepts Finished Goods' offer. 1115: Production offers to purchase Raw Materials (RM) from inventory. 1116: Raw Materials accepts Production's purchase offer. 1117: If the raw materials needed to fulfill the production are NOT on hand, then Raw Materials offers to purchase from the Purchasing Department. 1118: The Purchasing Department accepts Raw Materials' purchase offer. 1119: Purchasing Department offers to purchase from an external vendor. 1120: The external vendor accepts the Purchasing Department's offer. 1121: Production offers to purchase Direct Labor from the Human Resources (HR) Department. 1122: Human Resources accepts Production's offer to purchase direct labor hours at cost. 1123: Production offers to purchase equipment time at cost from Fixed Assets (FA). 1124: Fixed Assets accepts WIP's offer to purchase equipment time. 1125: Once the quantity purchased 1109 by the external buyer is manufactured/available, Finished Goods offers to purchase transportation from the Shipping Department. 1126: Shipping accepts Finished Goods' offer and ships the quantity ordered to the external customer. 1127: The external customer receives the goods ordered and pays the company, completing the original external transaction.

Figure 10:
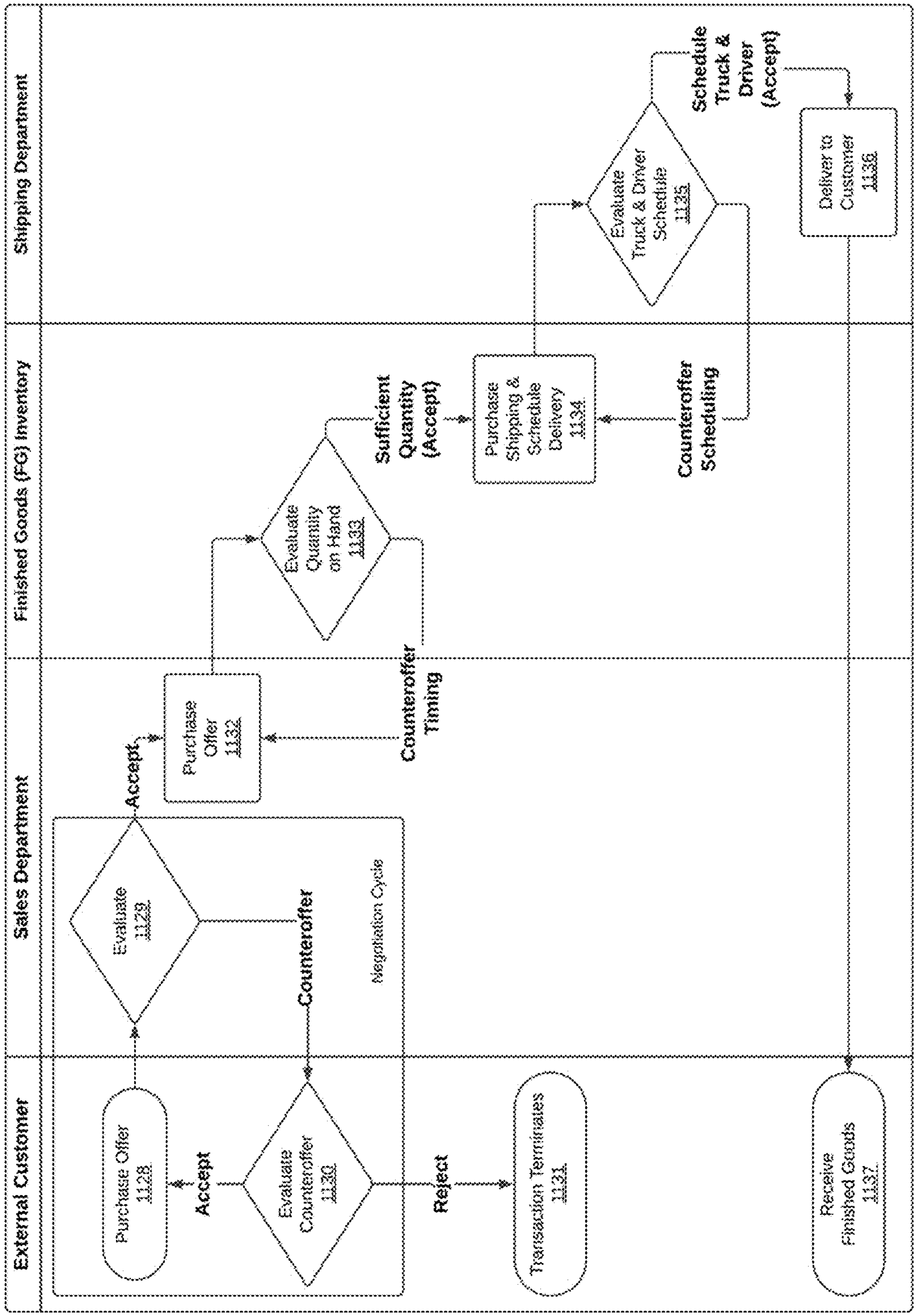
FIG. 10 is a process flow diagram of an extramural transaction that leads to the delivery of finished goods on hand.

FIG. 10 depicts the Transaction and Reservation block flow in an extramural customer-initiated inventory asset purchase transaction. 1128: An external customer issues a Purchase Offer 1011 to the company (Sales Department). 1129: The Sales Department receives the customer's purchase offer, and, following the Bill of Process, the Evaluating smart contract cascades through all intramural transactions' evaluating smart contracts to test the deliverability of the Purchase Offer 1011 hypotheses (terms). If the Evaluating smart contract determines the Purchase Offer 1011 terms cannot be fulfilled, the sales department amends the Purchase Offer, and counter offers to the prospective buyer. 1130: The customer evaluates the amended Purchase Offer. If the amendments are acceptable, the customer re issues 1128 the Purchase Offer 1011 completing the negotiation cycle. 1131: If the customer does not accept the counteroffer, the transaction is terminated. 1132: If the Sales Department accepts the customer's Purchase Offer, the Sales Department issues a Purchase Offer 1011 to Finished Goods inventory. 1133: Finished Goods inventory evaluates the quantity on hand. Finished Goods accepts the Sales Department's Purchase Offer. 1134: Finished Goods issues a Purchase Offer 1011 to the Shipping Department for delivery. 1135: The Shipping Department evaluates the availability of a truck and driver as requested. 1136: The Shipping Department accepts (schedules the truck and driver) and delivers to the customer. 1137: The customer receives the goods purchased.

Figure 11:
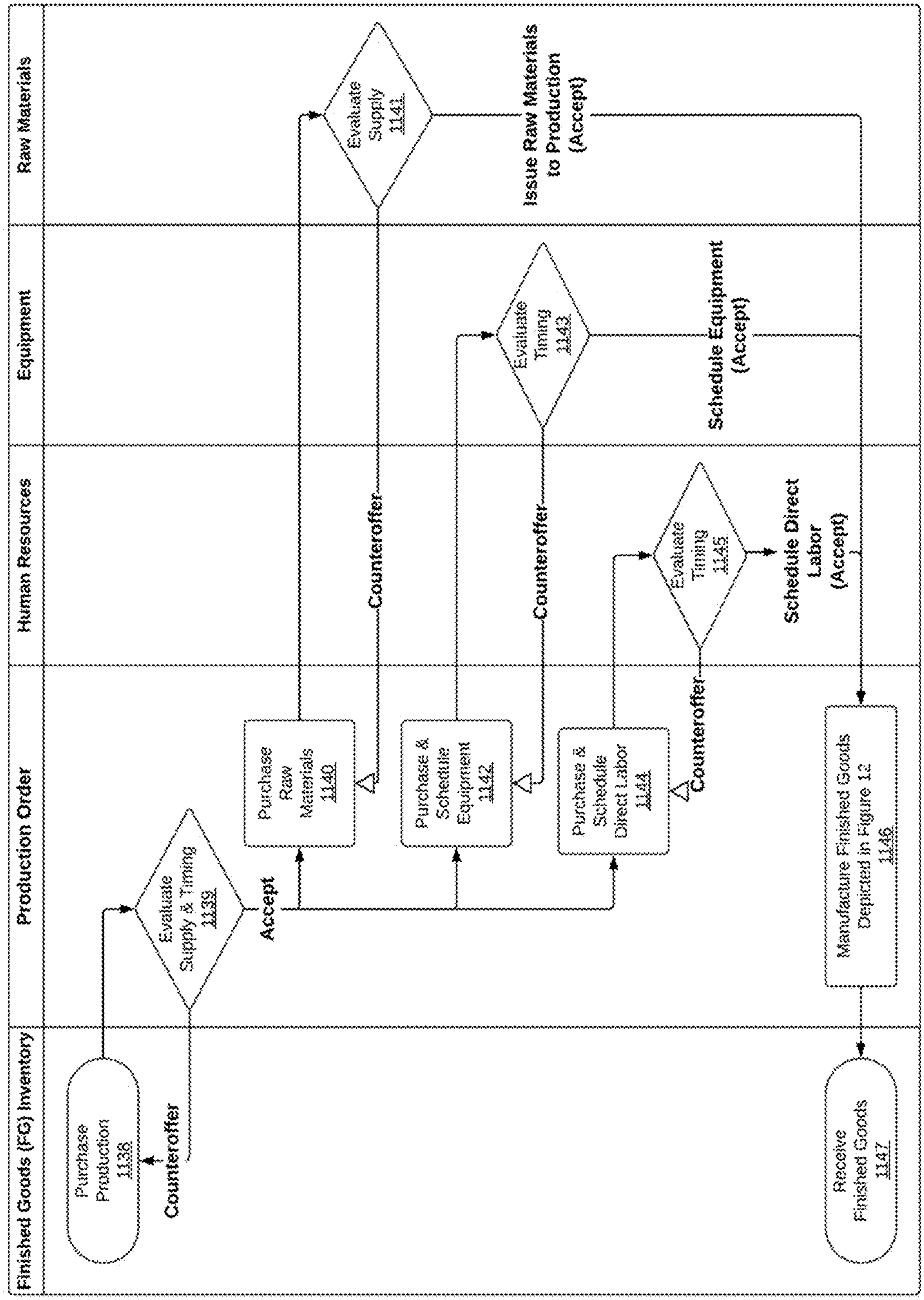
FIG. 11 is a process flow diagram of intramural cascading transactions of a production work order.
Figure 12:
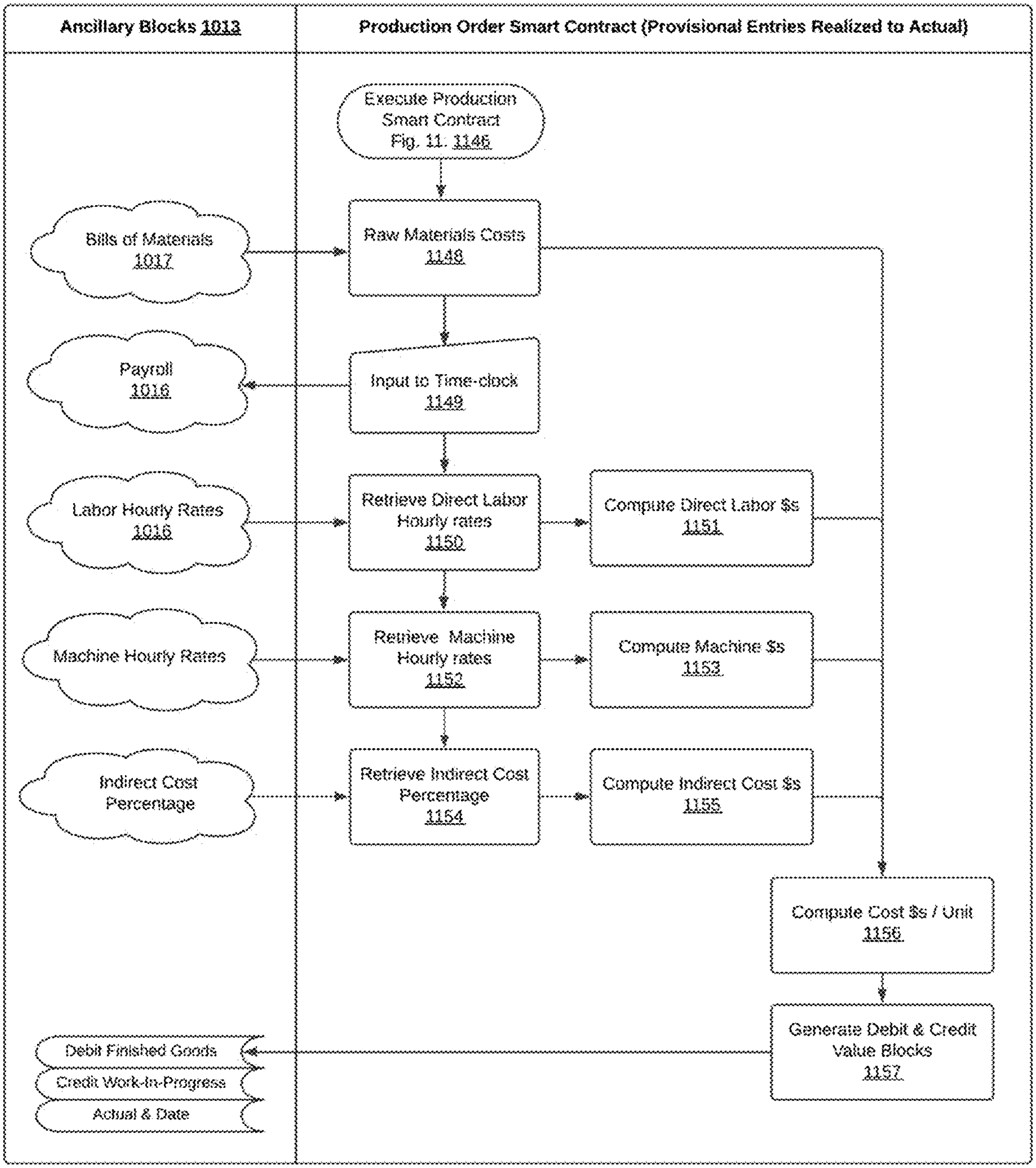
FIG. 12 is a process flow diagram of the costs realized in the completion of the production work order from FIG. 11.

FIG. 11 depicts the internal flow of smart logistical 1027 contracts in which the inventory quantity on hand is insufficient, or the inventory levels have fallen below a minimum inventory target, and the company must manufacture additional units. Note that the internal negotiation cycles cannot be rejected but are counter-offered until the resources and timing of the internal Purchase Offer 1011 hypotheses are satisfied. 1138: Finished Goods inventory issues a Purchase Offer 1011 to the Production Department. 1139: Within the Bill of Process 1028 smart contract, the Production Order evaluating smart logistical contract cycles through all steps to manufacture and deliver the inventory to Finished goods. Each of the Evaluating 1034 smart logistical contracts negotiates until the material supply, direct labor timing, and machine availability hypotheses are satisfied. 1140: The Production Order 1028 purchases Raw Materials according to the Bill of Materials. 1141: The Raw Materials inventory assigns the materials to the Production Order 1028 and reserves delivery on the date and time according to the production schedule. 1142: The Production Order 1028 purchases machine time and schedules the manufacturing equipment usage. 1143: The Fixed Asset function accepts the Production Order offer and blocks out the date, time, and duration for the use of the production equipment. 1144: The Production Order 1028 purchases Direct Labor and schedules a machinist. 1145: Human Resources assigns a machinist to the Production Order 1028. 1146: The Production Order 1028 smart logistical contract executes the finished goods manufacturing process on the scheduled date and time. Note: The production cost accounting steps of the manufacturing process are depicted in FIG. 12. Once the production run is complete, the Production Order 1028 delivers the finished goods and closes out the Production Order. 1147: Finished Goods receives the physical inventory and all direct costs (Raw Materials, Direct Labor, and Overhead).

FIG. 12 depicts the production and cost accounting as the production process is completed. 1146: The Production Order 1028 smart logistical contract executes the finished goods manufacturing process on the scheduled date and time as per the production order. 1148: The Production Order 1028 smart contract retrieves the Bill of Materials 1017 from the ancillary information blockchain and adds the costs to the work in progress. 1149: The Production Order 1028 smart logistical contract prompts the machine operator to record their actual direct time in a time clock, which updates the payroll ancillary information 1016. 1150: The smart contract 1028 retrieves the machine operator's hourly dollar rate from the Employee ancillary Information 1016. 1151: The Production Order 1028 smart logistical contract computes the direct labor dollars and posts a debit entry to the work in progress, crediting the cost from indirect payroll expense. 1152: The Production Order 1028 smart logistical contract retrieves the machine's hourly (or per unit) dollar rate from the Fixed Asset/Equipment Information blocks. 1153: The Production Order 1028 smart logistical contract computes the direct machine cost dollars and posts a debit entry to the work in progress, crediting the cost from indirect depreciation expense. 1154: The Production Order 1028 smart logistical contract retrieves the pre-established indirect cost percentage from the distributed ledger. 1155: The Production Order 1028 smart logistical contract computes the indirect cost dollars and posts a debit to the work in progress, crediting the cost from indirect costs. 1156: The Production Order 1028 smart logistical contract sums the raw materials, direct labor charges and applied overhead to the work in progress. 1157: The Production Order 1028 smart logistical contract divides the total cost by the number of units produced. The smart contract 1028 transfers the total cost of the manufactured items to Finished Goods and relieves the costs from Work in Progress inventory (Debit Finished Goods; Credit Work in Progress production order).

Figure 13:
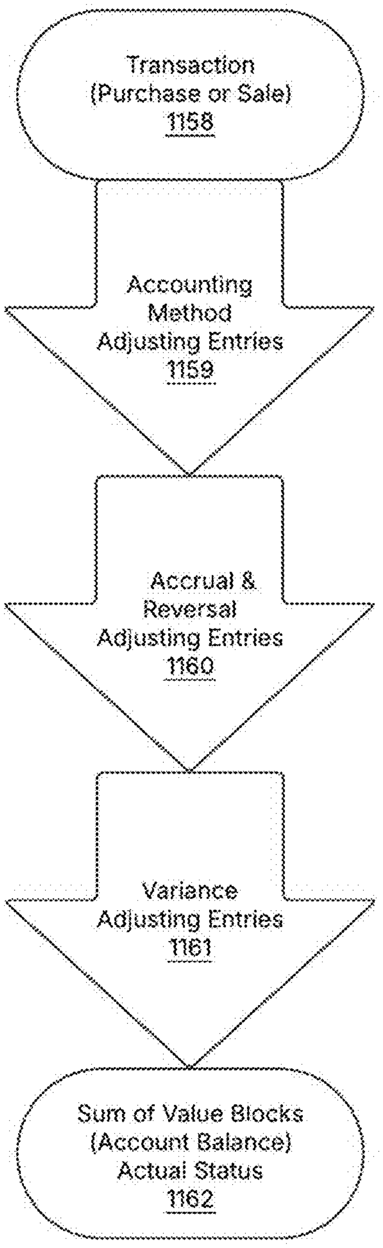
FIG. 13 is a diagram of the journal entries from the initial transaction to final, realized balance.

FIG. 13 depicts the flow of distributed ledger entries from inception to final (Actual) balances. 1158: The initial entry is a purchase (or sales) transaction. Transaction entries are common to all accounting methods and are shared within the distributed ledger. 1159: Accounting method 1030 adjusting entries are specific to the method of accounting. These entries are predefined in the accounting method 1030 smart contracts for each type of purchase or sale. For example, a construction company's long term contract revenue is recognized under US GAAP by the percentage of completion smart contract, whereas the same company's sale of equipment revenue is recognized when the item is shipped. 1160: The month end accrual and reversal adjusting entries 1031 are posted for financial statement timing purposes. 1161: Variance adjustment entries 1032 are posted when the provisional 1007 or pending 1008 entries are realized. 1162: Realized entries are the sum of all preceding unrealized transaction and adjustment entries.

Figure 14:
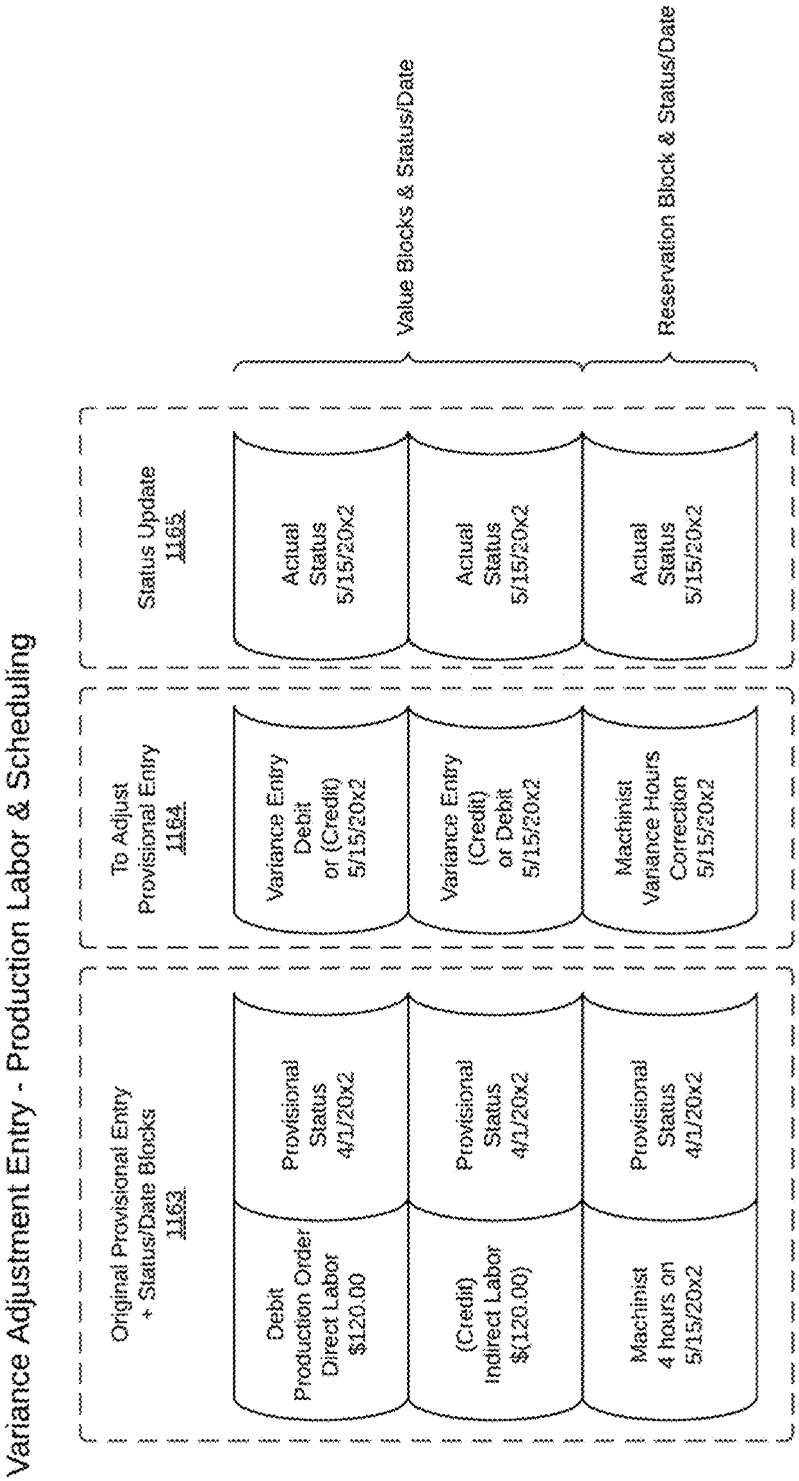
FIG. 14 depicts an example of the status updating of an original provisional journal entry and reservation blocks, variance adjustments, and, realized journal entry and reservation blocks upon transaction completion.

FIG. 14 depicts the evolution of transaction provisional entries and reservations, variance adjustments, to realization once the transaction is complete. Example 14-A: 1163: (a) On 4/1/20x2, a Bill of Process 1128 smart contract purchases four direct labor hours for a machine operator ($30/hour) from the Human Resources function. (b) Human Resources accepts Production's offer and fulfills the smart contract by scheduling a machine operator for four hours on May 15, 20x2, and posting a Provisional 1007 entry for the budgeted costs: debit the Production Order $120 and credit indirect labor $120 on May 15, 20x2. (c) The smart contract records a Provisional 1007 Reservation 1012 for four hours budgeted per the Bill of Production 1128. 1164: (d) On May 15, 20x2, the machinist works five hours to complete the production order and inputs their time via timeclock linked to the distributed ledger. (e) The Production 1128 smart contract executes a variance 1032 adjusting entry to add $30 to the production order for the additional hour needed to complete the production: Debit Production Order Direct Labor $30 and Credit Indirect Labor $30. (f) The variance entry also adds the additional hour to the budgeted four-hour reservation to document the additional time required to complete the production run. 1165: (g) The Production 1028 smart contract executes an Updating 1035 smart contract to change the Provisional 1007 status of the entry and scheduling block to Actual 1004. (h) The realized direct labor charge to the production order is $150. Note 14-A: Had the machinist completed the production in two hours, then the variance entry would have been Debit Indirect Labor $60 (for the two hours under budget compared with the Bill of Production 1028) and Credit Production Order Direct Labor $60, then notify the Human Resources that the machinist was available for re assignment for the two hours saved. Note 14-B: If the Production Order schedule had been delayed, the Updating 1035 smart contract changes the entries' status to Pending 1008 and the scheduling 1036 smart contract moves the reservation 1012 to a new, pending 1008, target date.

Figure 15:
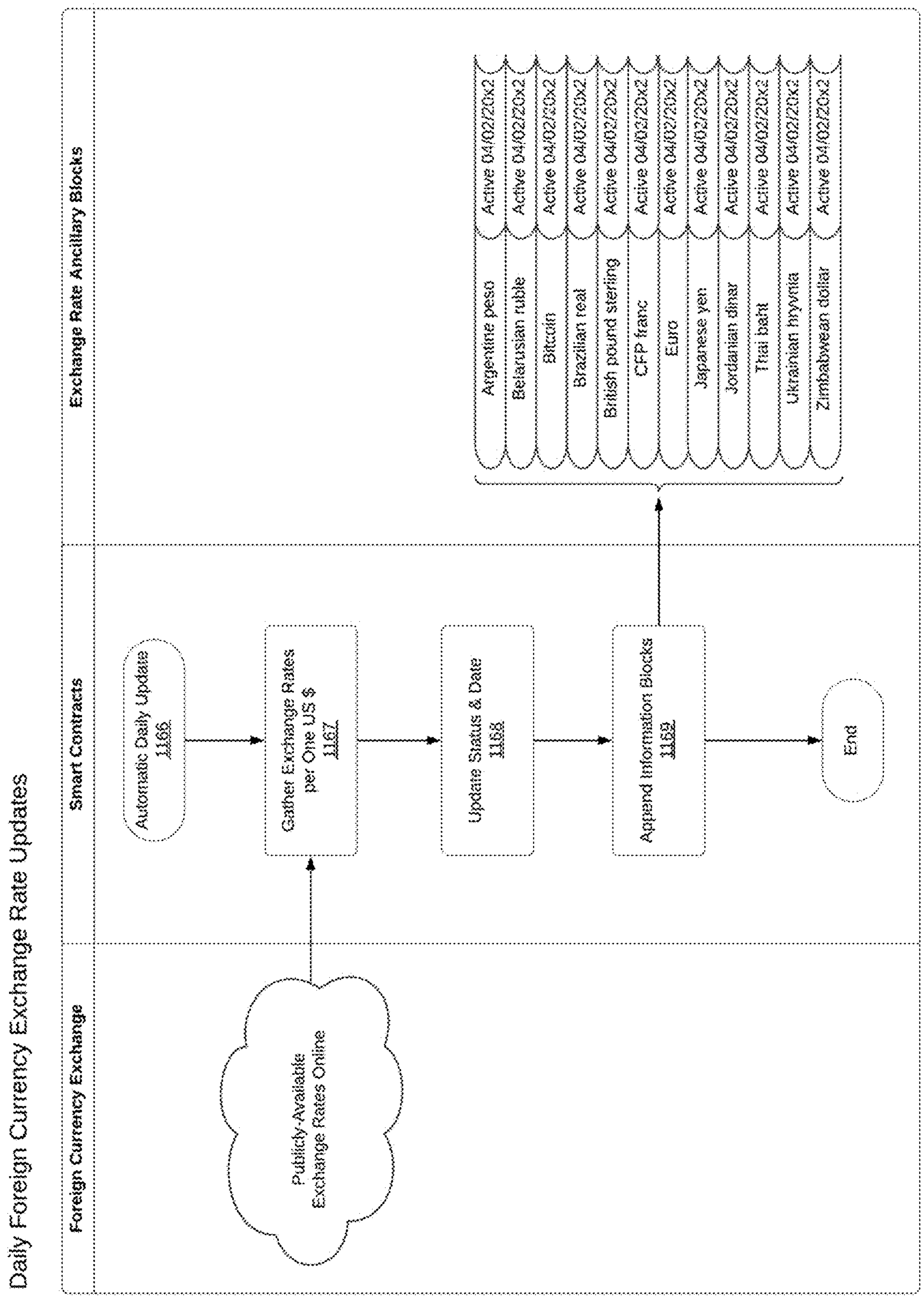
FIG. 15 is a process flow diagram of the daily update to the exchange rate ancillary information blockchain.

FIG. 15 depicts a process in which smart contracts download the daily currency exchange rates per US dollar and append to the ancillary information Exchange Rate blocks 1019. 1166: Daily, the Foreign Currency Rate Update smart contract automatically executes. 1167: The Smart Contract downloads publicly available foreign currency exchange rates per one US dollar via the internet. 1168: The Status & Date Updating smart contract assigns Active status and that day's date. 1169: The Foreign Currency Rate Update smart contract appends the exchange rates retrieved to the distributed ledger.

Figure 16:
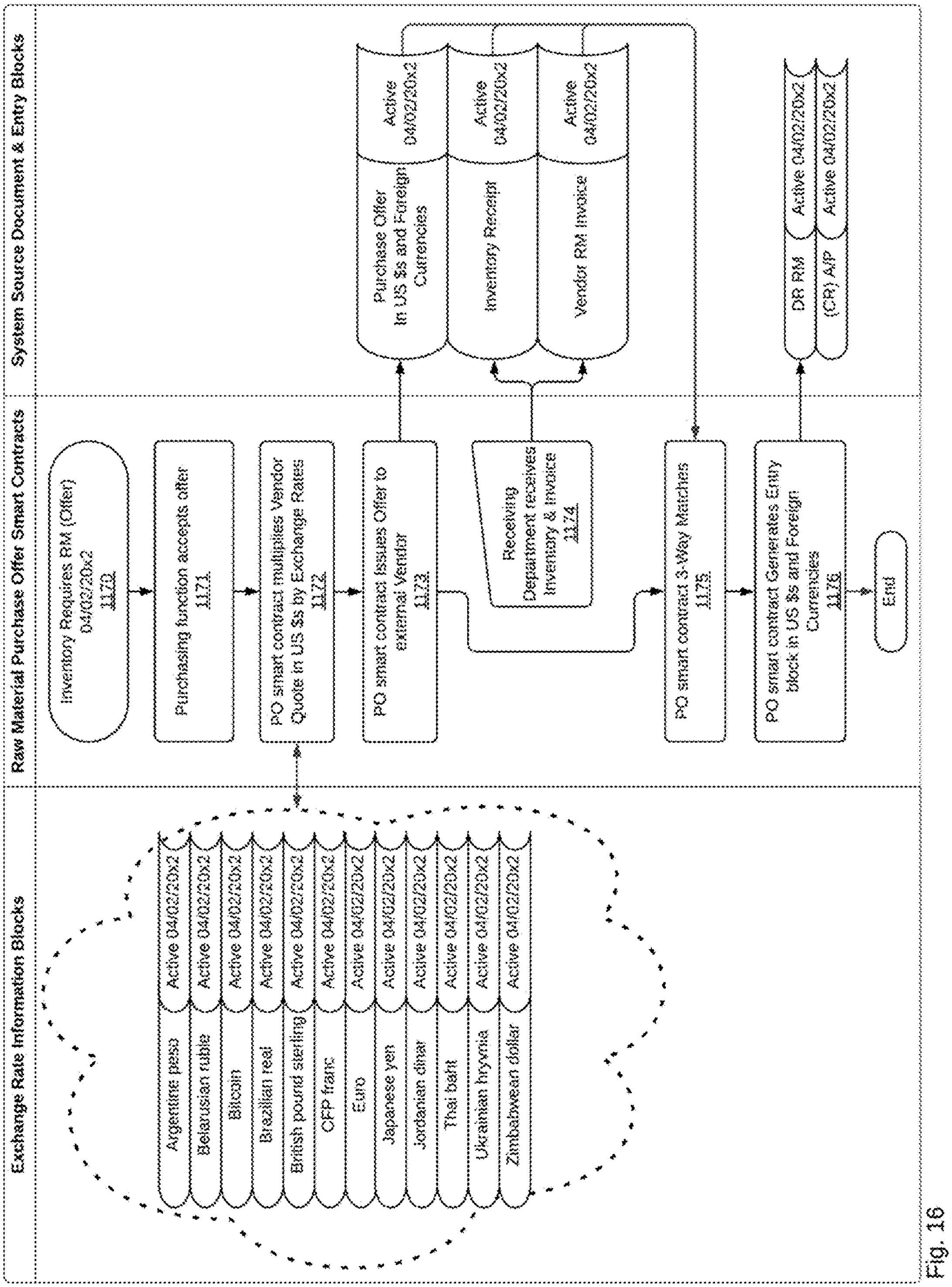
FIG. 16 is a process flow diagram of the foreign currency ancillary information blocks applied to a purchase order and journal entries.

FIG. 16 depicts an example of the smart contract flow steps for applying foreign currency exchange rates to entries. 1170: A Work in Progress production order requires Raw Materials. The production order smart contract issues a purchase offer 1011 to Raw Materials. 1171: Raw Materials accepts the offer but the inventory on hand is insufficient to fulfill the order and executes an extramural purchase transaction 1025 with a vendor from the ancillary approved vendor list 1015. 1172: The transaction 1025 smart contract retrieves the foreign currency exchange rate and multiplies the exchange rates by the US dollar value of the purchase offer 1011 to derive the purchase offer values in the foreign currencies. 1173: The transaction 1025 smart contract generates the offer and status/date blocks and issues the PO 1011 to the vendor 1015. 1174: The Shipping & Receiving department physically receives the materials purchased and vendor invoice. An operator inputs the receipt of goods into the distributed ledger along with the invoice. The Receiving smart contract creates Inventory Receipt and Invoice blocks with status/date blocks. 1175: The Transaction 1025 smart contract matches the purchase offer 1011, Receipt of Goods, and Invoice without exception. 1176: The transaction 1025 smart contract generates an entry to record transaction: Debit Raw Materials and Credit Accounts Payable. The two value blocks contain the values in all currencies as input by the Transaction 1025 smart contract.

Figure 17:
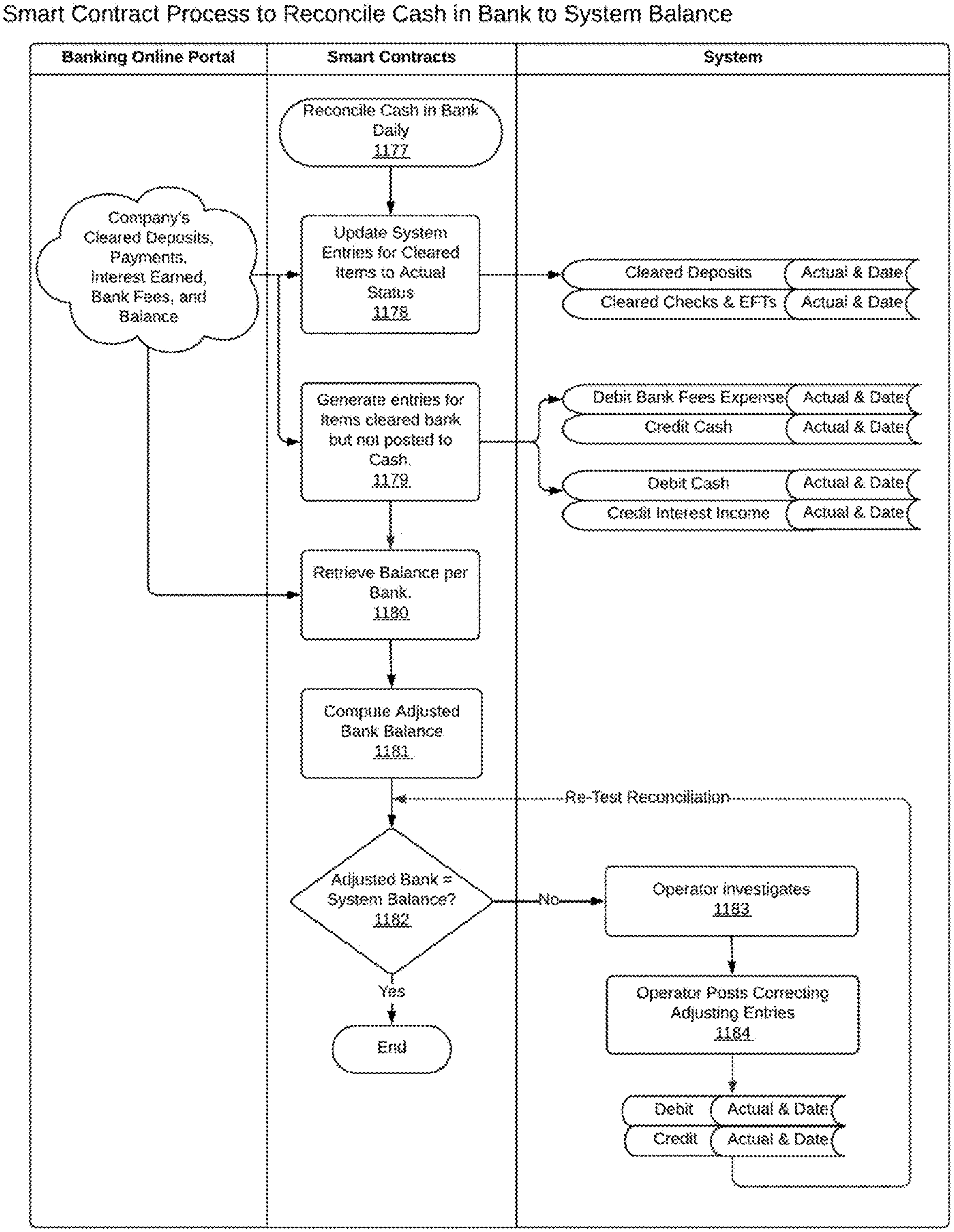
FIG. 17 is a process flow diagram of the daily realization of cash journal entries, adjustments, and the bank account reconciliation to the distributed ledger.

FIG. 17 depicts the daily automatic smart contract process steps to reconcile the cash in bank and transactions to the system's transactions and balance. 1177: Daily, the bank reconciliation smart contract executes automatically. 1178: The Reconciling smart contract updates the distributed ledger Provisional and Pending entries to Actual for all banking activity, which "clears" the distributed ledger entries from the reconciliation. 1179: The Reconciling smart contract records variance adjusting entries for all banking items that are not recorded in the distributed ledger, such as bank fees and interest income. 1180: The Reconciling smart contract retrieves the company's balance per bank. 1181: The smart contract computes the Adjusted Bank Balance, which is equal to the Balance per Bank plus deposits in transit minus outstanding disbursements. 1182: The Evaluating smart contract compares the adjusted bank balance to the distributed ledger cash balance. If the Adjusted Bank Balance equals the distributed ledger cash balance, the smart contract terminates for the day. 1183: If the Adjusted Bank Balance does NOT equal the distributed ledger balance, then the smart contract sends an error message to the operator to investigate the difference. 1184: The operator investigates the difference between the adjusted bank balance and the distributed ledger cash balance and posts a variance adjusting entry. The Reconciling smart contract re-tests the reconciliation 1182.

Figure 18:
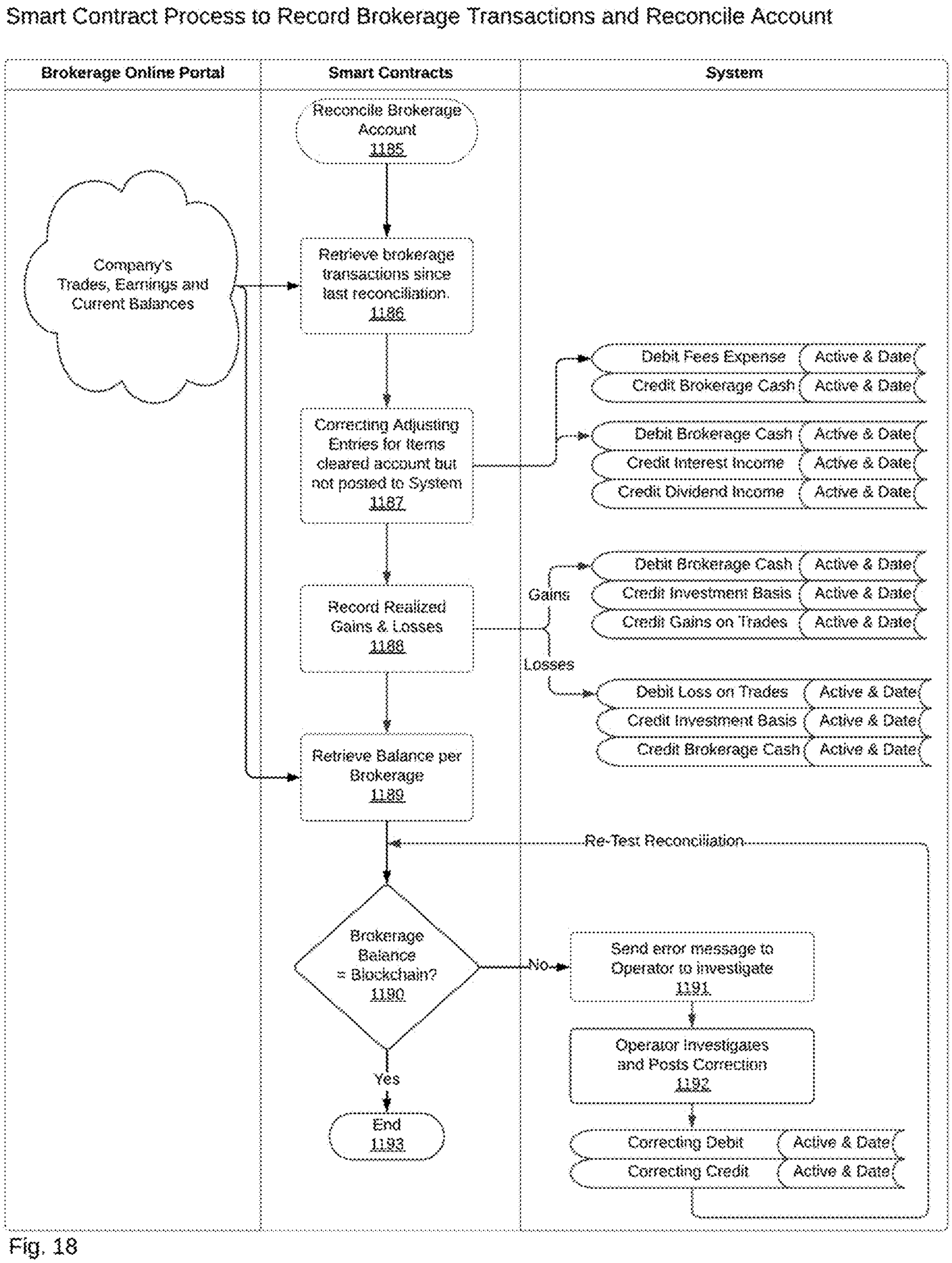
FIG. 18 is a process flow diagram to daily record brokerage transactions and reconcile the brokerage account balance to the distributed ledger.

FIG. 18 depicts the daily automatic smart contract process steps to reconcile brokerage account trades and activity to the distributed ledger entries and balance. 1185: Daily, the brokerage account reconciliation smart contract executes automatically. 1186: The Reconciling smart contract retrieves the company's brokerage transactions since the last reconciliation for settled trade proceeds; deposits; withdrawals; interest earned; dividends earned; and, brokerage fees. 1187: The Reconciling smart contract posts distributed ledger variance adjusting entries to record items that were posted to the brokerage account, but not to the distributed ledger. 1188: The Reconciling smart contract computes realized gains and losses (proceeds minus asset cost or basis) and posts distributed ledger variance adjusting entries to record realized gains and losses. 1189: The Reconciling smart contract retrieves the company's brokerage account ending balance. 1190: The Evaluating smart contract compares the adjusted brokerage balance to the distributed ledger brokerage balance. 1191: If the brokerage account ending balance does NOT equal the distributed ledger balance, then the Reconciling smart contract sends an error message to the operator to investigate the difference. 1192: The operator investigates the difference between the brokerage account ending balance and the distributed ledger balance and posts a variance adjusting entry. The Reconciling smart contract tests the reconciliation again. 1193: Once the brokerage account ending balance equals the distributed ledger brokerage balance, the smart contract terminates for the day.

Figure 19:
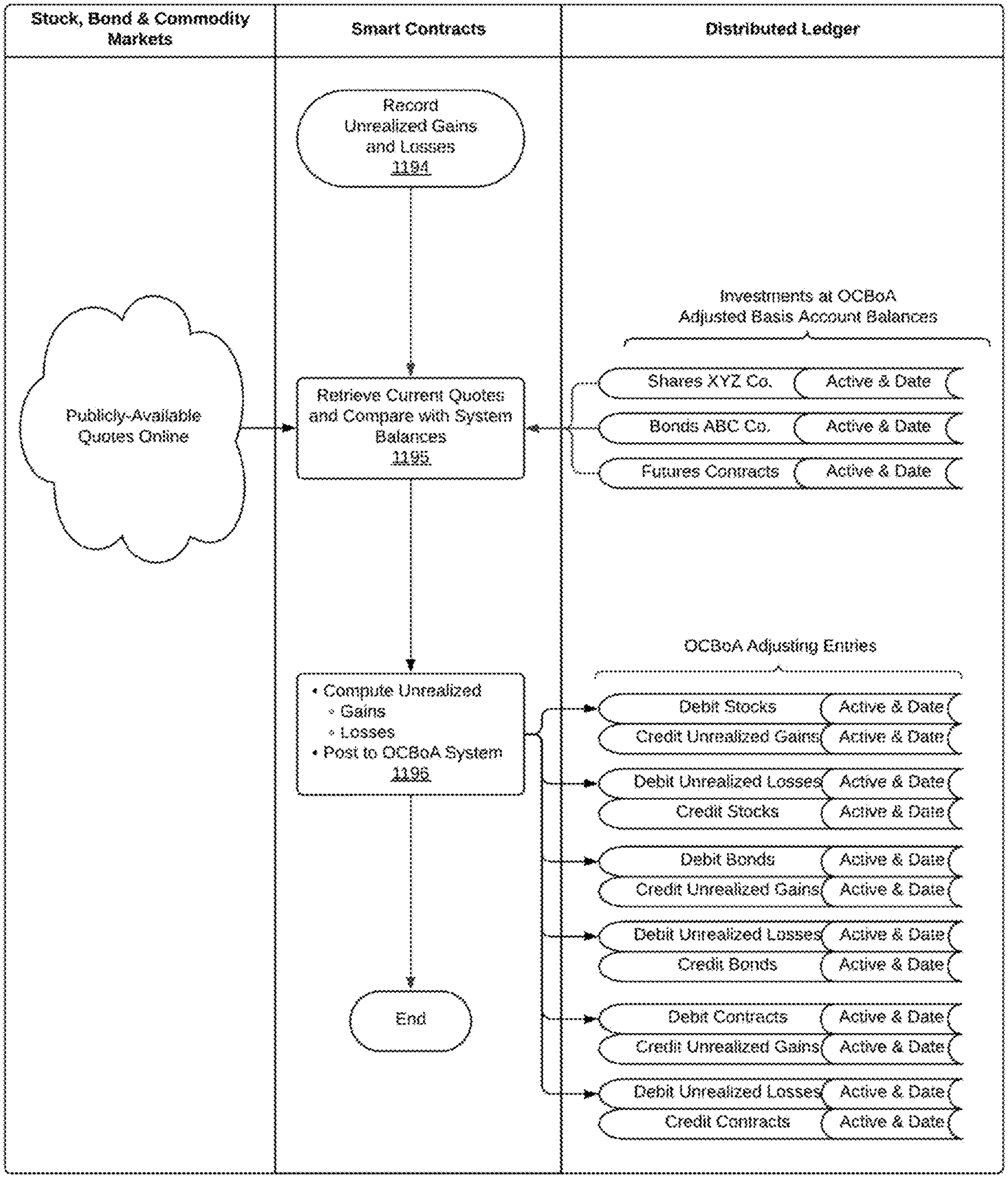
FIG. 19 is a process flow diagram to daily record unrealized gains and losses on investments held in the distributed ledger.

FIG. 19 depicts the Other Consistent Basis of Accounting (OCBoA) 1208 Method Adjustment to record investment unrealized gains and losses. 1194: Daily, investment monitoring smart contract executes automatically. 1195: The OCBoA Method Adjustment smart contract retrieves stock, bond, and commodity quotes from public information on the internet and compares the OCBoA investment portfolio account balances. 1196: The smart contract computes unrealized gains and losses (current market value minus asset cost or basis) and posts adjusting entries for unrealized gains and losses. Note 19-A: The unrealized gains and losses are only posted using the OCBoA accounting method since no other accounting method recognizes unrealized gains and losses.

Figure 20:
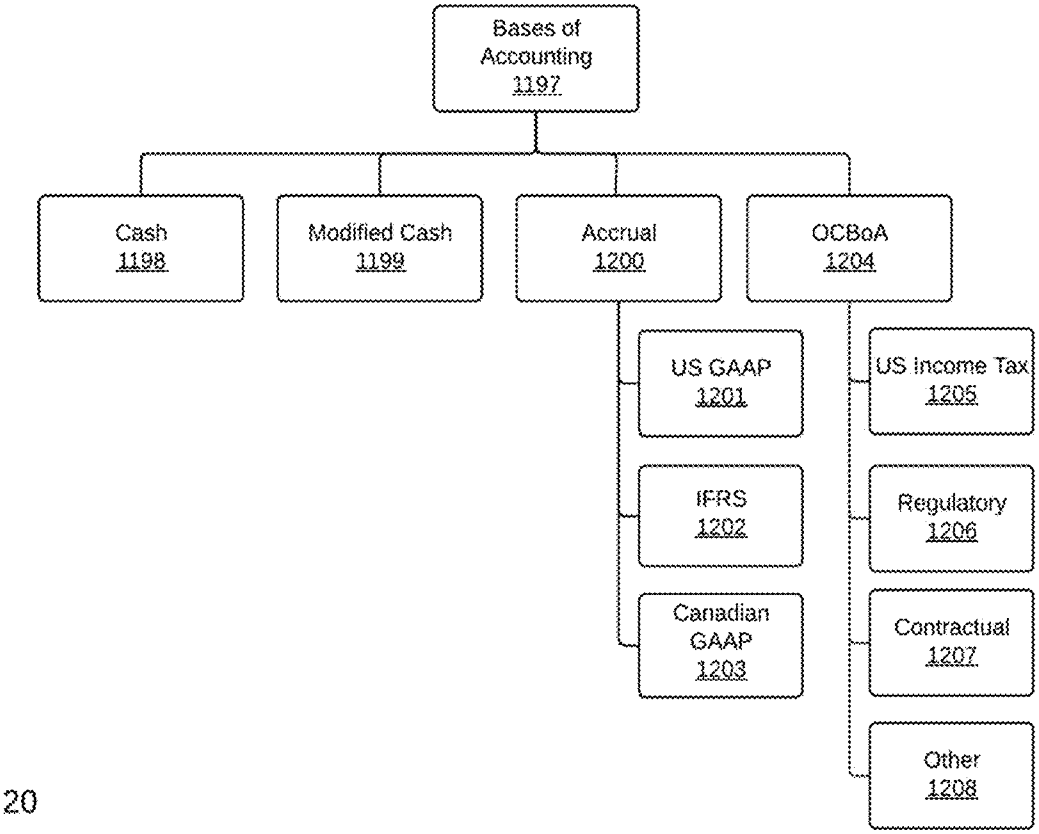
FIG. 20 is an organizational chart of the bases and methods of accounting.

FIG. 20 depicts the bases of accounting and their relationships to accounting methods. 1197: all Methods and bases of accounting. 1198: Cash Basis: Recognize revenue upon cash receipt and record expenses when disbursed. 1199: Modified Cash Basis: Cash basis except that long lived assets (plant and equipment) are depreciated over the life of the asset. Long-term liabilities (mortgage notes payable, for example) are recorded with the monthly principal payments charged against the liability and interest is charged off as an expense. 1200: Accrual Basis: Recognize revenue when earned and record expenses when a corresponding liability is incurred. 1201: Generally Accepted Accounting Principles in the United States are a set of accounting rules, standards, and procedures issued and frequently revised by the Financial Accounting Standards Board (FASB) and the Governmental Accounting Standards Board (GASB). 1202: International Financial Reporting Standards (IFRS) are a set of accounting rules for public companies that are intended to make financial statements consistent, transparent, and easily comparable around the world. IFRS currently has complete profiles for 168 jurisdictions, including those in the European Union. 1203: Generally Accepted Accounting Principles in Canada are a framework of rules, conventions, procedures, and guidelines for accounting. Canadian GAAP is based on standards issued by the Accounting Standards Board (AcSB) of the Canadian Institute of Chartered Accountants. 1204: Other Comprehensive Bases of Accounting (also referred to as a "special purpose framework"). 1205: US Income Tax: A basis of accounting that the entity uses to file its tax return as prescribed by the Internal Revenue Code (IRC), Regulations, and, Revenue Procedures. 1206: Regulatory Basis: A basis of accounting that an entity uses to comply with the requirements or financial reporting provisions of a regulatory agency to whose jurisdiction the entity is subject (for example, a basis of accounting that insurance companies use pursuant to the accounting practices prescribed or permitted by a state insurance commission). 1207: Contractual Basis: A basis of accounting that the entity uses to comply with an agreement between the entity and one or more third parties. 1208: Other Basis: A basis of accounting that uses a definite set of logical, reasonable criteria that is applied to all material items appearing in financial statements.

Note 20-A: The difference between an accounting basis and method is more of a distinction, and as such are used interchangeably in this patent application. Note 20-B: An entity would not employ all accounting methods available in the distributed ledger. For example, a manufacturing company would not use an insurance commission's regulatory basis of accounting.

Figure 21:
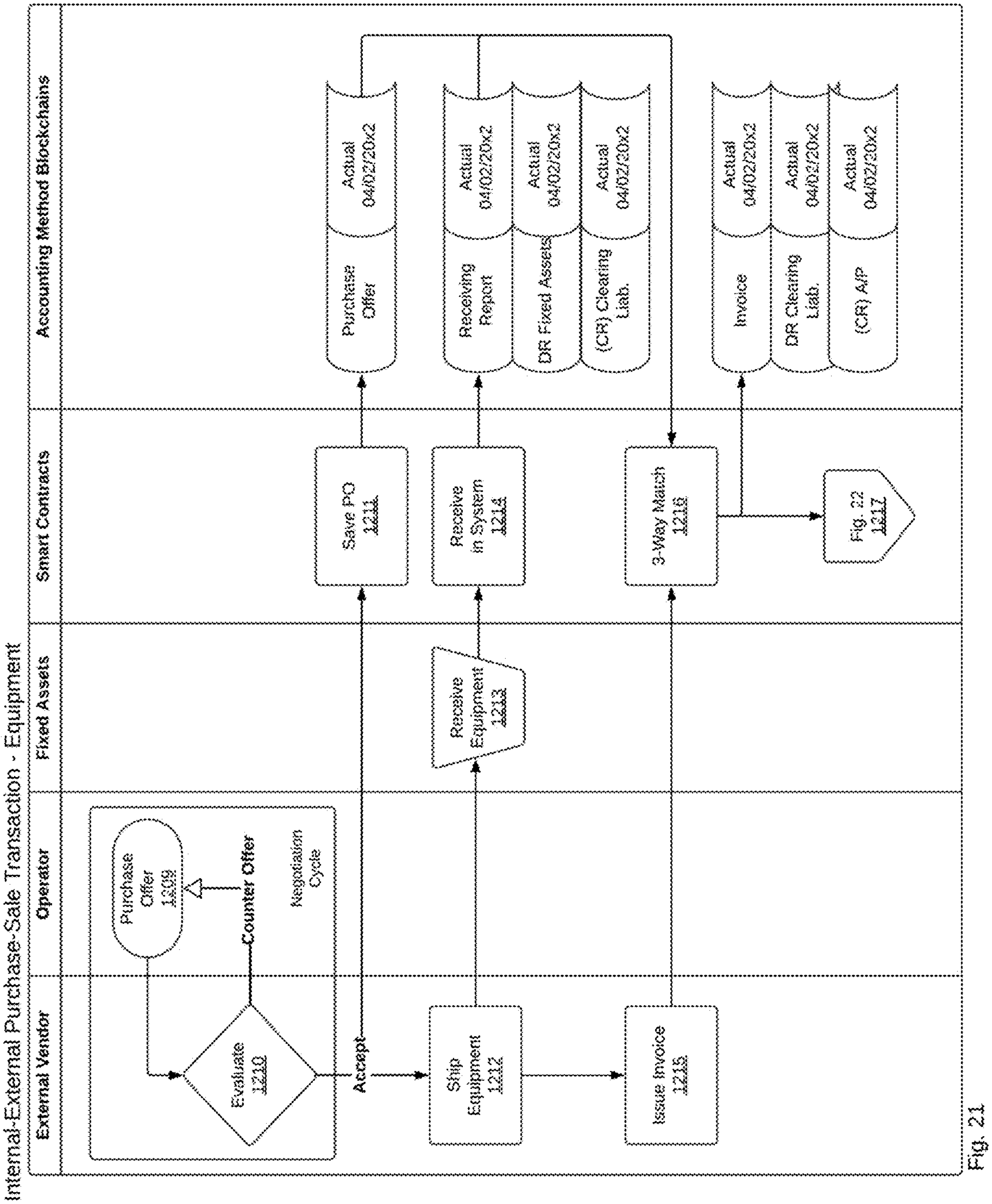
FIG. 21 is a process flow diagram for an extramural equipment purchase transaction and resulting realized journal entries.

FIG. 21 is a flow diagram of the steps to purchase equipment, and the resulting documents and transaction entry blocks common to all accounting methods. 1209: The operator issues a Purchase Offer 1011 to an external vendor 1015. 1210: The external vendor evaluates the offer and after negotiating with the operator accepts the transaction. 1211: The transaction 1025 smart contract saves the approved Purchase Offer to the distributed ledger with an attached Active 1004 status block. 1212: The vendor ships the equipment. 1213: The company's Fixed Asset function receives the equipment. 1214: The transaction 1025 smart contract saves the Receiving Report to the distributed ledger with an attached Active 1004 status block and records an entry debiting fixed assets and crediting a temporary current liability clearing account. 1215: The vendor issues an invoice for the equipment. 1216: The Purchase Offer smart receives the vendor invoice and saves it to the distributed ledger with an Active status block and records an entry debiting the temporary current liability clearing account and crediting accounts payable with active 1004 status blocks after matching with the purchase offer 1011 and receiving report blocks. 1217: Continue to FIG. 22.

Figure 22:
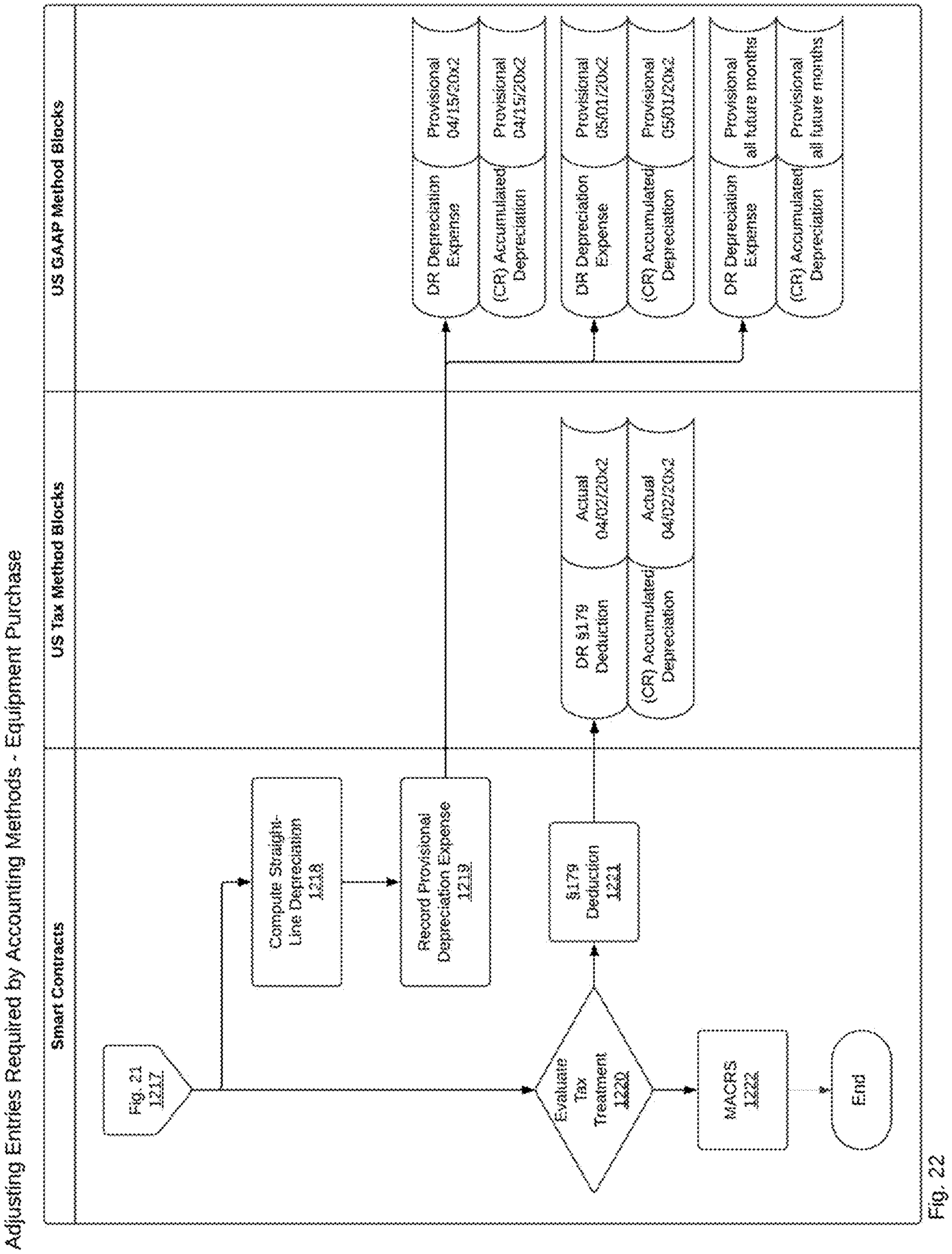
FIG. 22 is a process flow diagram of the US GAAP and US Income Tax methods of accounting smart contract adjustments and treatment for the equipment acquisition transaction depicted in FIG. 21.

FIG. 22 is a flow diagram of the steps to record the periodic expensing of the equipment cost (depreciation) under US GAAP and US Income Tax accounting methods. 1217: Continued from FIG. 21. 1218: The Accounting Method 1030 Adjustment (US GAAP) smart contract determines the asset class and useful life based on the data included in the original buyer's Purchase Offer 1011, then computes monthly straight-line depreciation expense based on a five-year useful life with no salvage value and a mid-month convention. 1219: The US GAAP method Adjusting 1030 smart contract records Provisional 1007 depreciation expense over 61 months since under the mid-month convention, the first and 61st months' expenses are one half of one sixtieth of the equipment cost. As the system reaches each Provisional 1007 date, the Updating smart contract changes the status from Provisional 1007 to Actual 1004, realizing the depreciation expense. 1220: The US Tax method smart contract 1030 evaluates the optimal deduction tax treatment under the Internal Revenue Code (IRC). The US Tax method Adjusting 1030 smart contract sums the § 179 deductions during the current tax year to date plus the cost of the equipment purchased and compares the sum to the maximum allowable deduction per year (26 U. S. Code § 179—Election to expense certain depreciable business assets). The Adjusting smart contract determines that the § 179 deduction is available for the purchase. 1221: The smart contract elects (under § 179) to immediately deduct the equipment cost and records the deduction in the US Tax method blockchain with an Active 1004 status as of the date of purchase of April 2, 20x2. 1222: Had the Evaluating 1034 smart contract determined that the § 179 election was not available, the smart contract would have computed tax deductions over the life of the equipment under the modified accelerated cost recovery system (MACRS). The MACRS deduction status and date would have been Active for the current year's deduction as of 4/2/20x2 and Provisional for all successive years' deductions: 1/1/20x3 to 1/1/final year for the asset's life as determined by the IRC Revenue Procedure.

Figure 23:
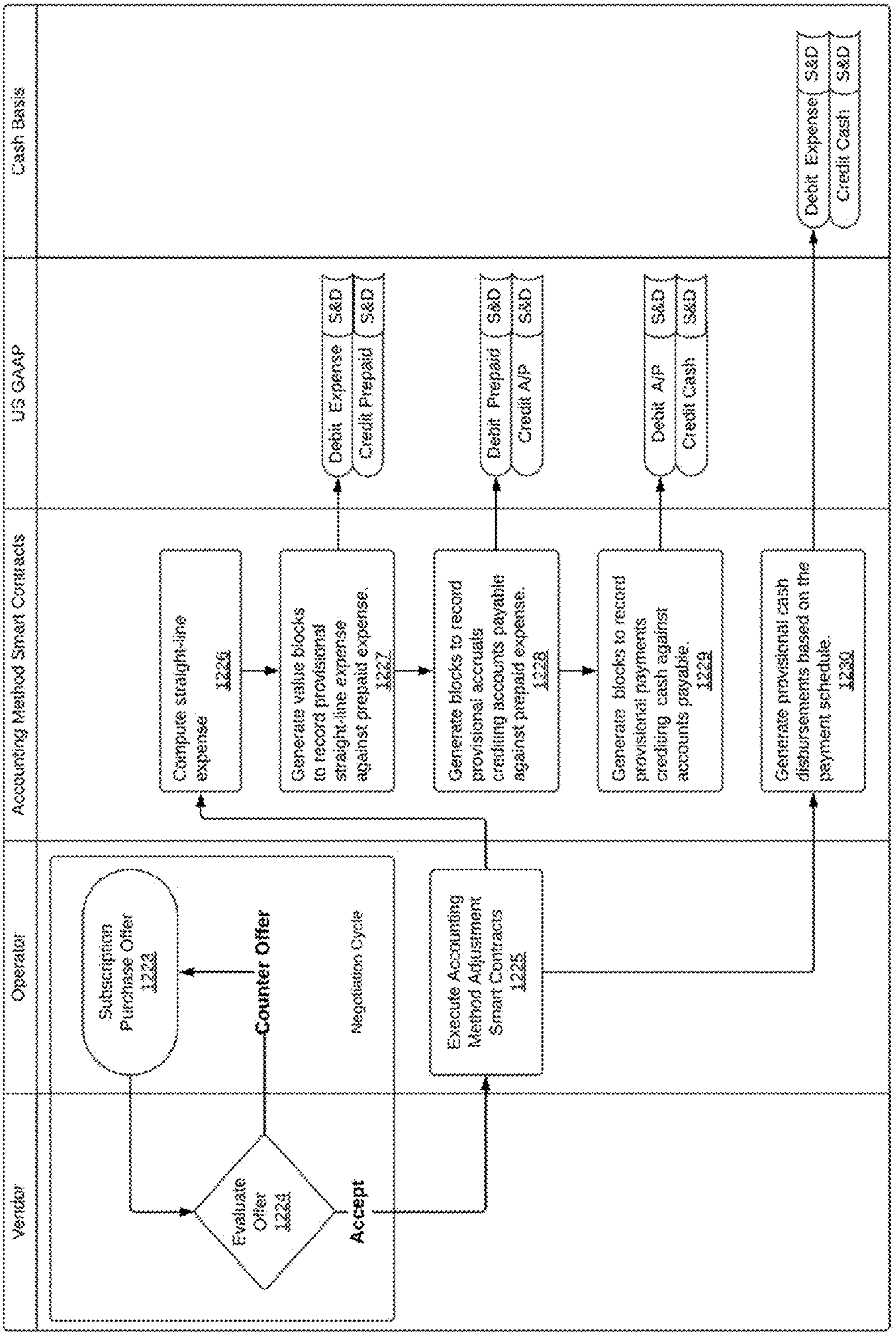
FIG. 23 is a process flow diagram of the US GAAP and Cash basis method of accounting smart contract adjustments for a long-term software subscription.

FIG. 23 compares the series of steps in the purchase of a three-year accounting software subscription with decreasing annual charges under US GAAP and Cash bases of accounting. 1223: The Operator issues a Purchase Offer 1011 to a vendor 1015 for a three-year accounting software subscription. Annual fees payable on the first day of the subscription year are: Year 1 $100K; Year 2 $75K; Year 3 $50K. 1224: The vendor accepts the offer in the negotiation cycle. 1225: Upon the vendor's acceptance, the operator takes delivery of the subscription and executes the method of accounting 1030 smart contracts. 1226: The US GAAP method smart contract computes the straight-line monthly expense over the three-year subscription term: $6.25K per month. 1227: The US GAAP method smart contract generates monthly Provisional 1007 straight-line expense entries against the pre-paid expense account for the $6.25K per month over the three-year subscription term, which are updated to actual 1004 each month. 1228: The US GAAP method 1030 smart contract generates Provisional 1007 entries based on the annual payment schedule (Debit Prepaid Expense & Credit Accounts Payable: Year 1 $100K; Year 2 $75K; Year 3 $50K). 1229: The US GAAP method 1030 smart contract generates Provisional 1007 entries based on the monthly payment schedule (Debit Accounts Payable & Credit Cash: Year 1 $100K; Year 2 $75K; Year 3 $50K). 1230: The cash basis method smart contract generates Provisional 1007 entries based on the annual payment schedule (Debit Subscription Expense & Credit Cash: Year 1 $100K; Year 2 $75K; Year 3 $50K). Note 23-A: Under both methods of accounting, the cash disbursements remain provisional 1007 until paid and realized 1004 through the execution of the Cash Disbursement 1026 smart contract.

Figure 24:
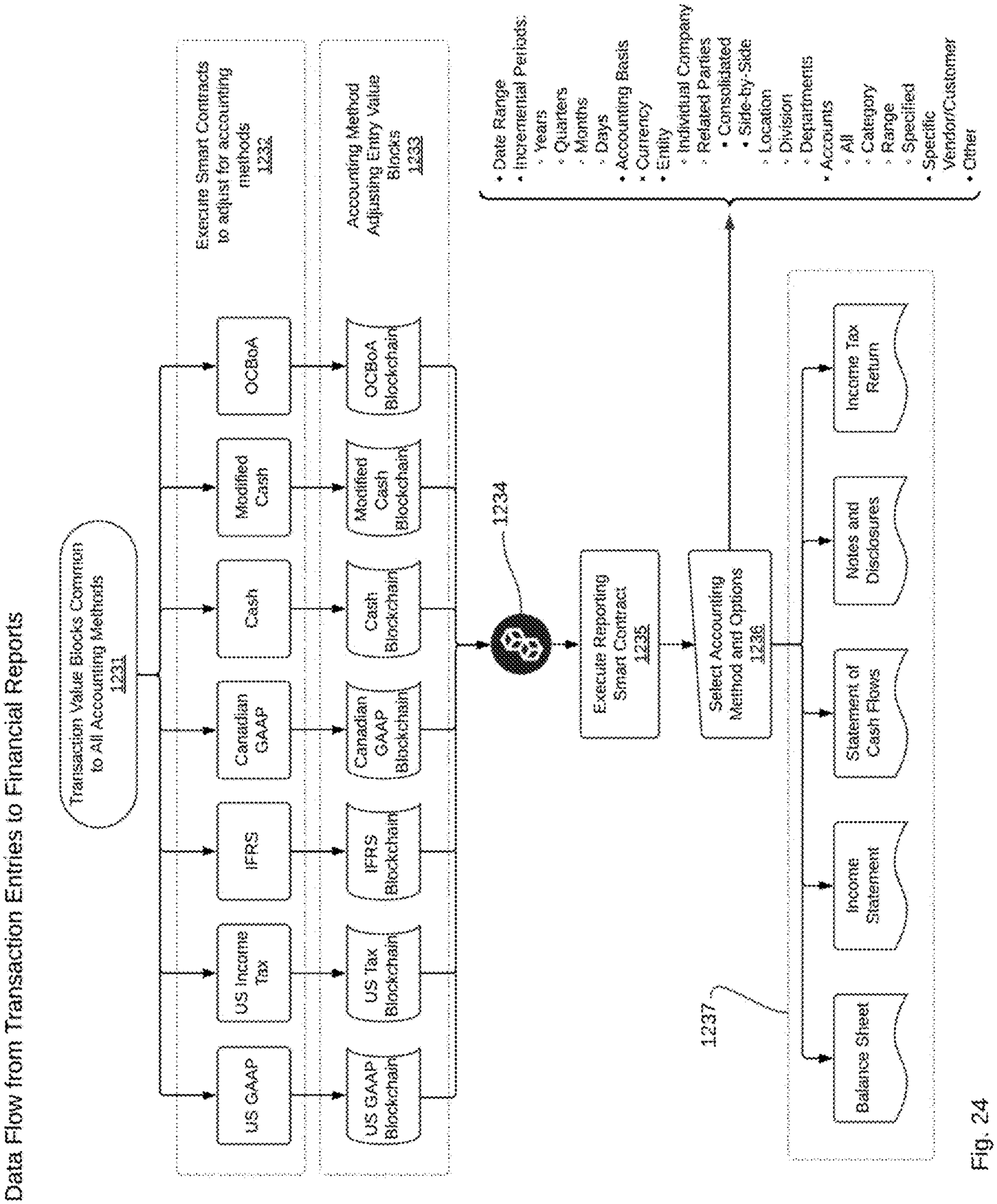
FIG. 24 is a data flow diagram from transaction value blocks common to all methods of accounting, parallel adjustments by accounting method smart contracts, and then, selecting value blocks to combine for financial statement reporting purposes.

FIG. 24 depicts the process flow of transaction 1022 journal entries which are adjusted for each accounting method and then combined for reporting purposes. Note that transaction 1023 smart legal contracts generate value block entries that are common to all accounting methods. For example, the effects and resulting entries of purchasing equipment are the same whether under US GAAP or US Tax, IFRS or any other accounting method. The method of accounting differentiates the treatment of the asset purchased and recorded, such as book depreciation versus allowable tax deductions to recover the cost of equipment. Intramural transactions 1027 are not affected by the method of accounting 1030 adjustments since they have not been completed. However, realized 1004 intramural transactions 1027 are included in the historical financial statements. Unrealized 1005 journal entries, both extramural 1023 intramural 1027 transactions are included in prospective financial statements and reports. (See FIG. 26 for data-set groupings for historical and prospective financial statements and forecasts) 1231: Transaction entries are common to all accounting methods. 1232: The pre-determined and coded Accounting Method 1030 Adjusting Entry smart contracts compute the realized 1004 and unrealized 1005 value blocks according to each method. 1233: All method of accounting journal entries are posted to the distributed ledger. 1234: Transaction 1022 journal entries and all method of accounting 1030 adjusting entries are available to be combined in reporting 1037 smart contracts. 1235: The operator executes the reporting 1037 smart contract. 1236: The reporting 1037 smart contract prompts the operator to select the desired: financial statement or report; the date range; incremental periods; accounting bases; currency; specific entity or multiple entities in a controlled group; location; company division or departments, specific accounts, range of accounts, or, all accounts; a specific vendor or customer; and, any other field within the value blocks 1002 to narrow the focus of the report. 1237: The reporting 1037 smart contract generates the reports or financial statements, which can then be: printed to hard copy; exported to a data file; or, saves the output to a portable document format (PDF).

Figure 25:
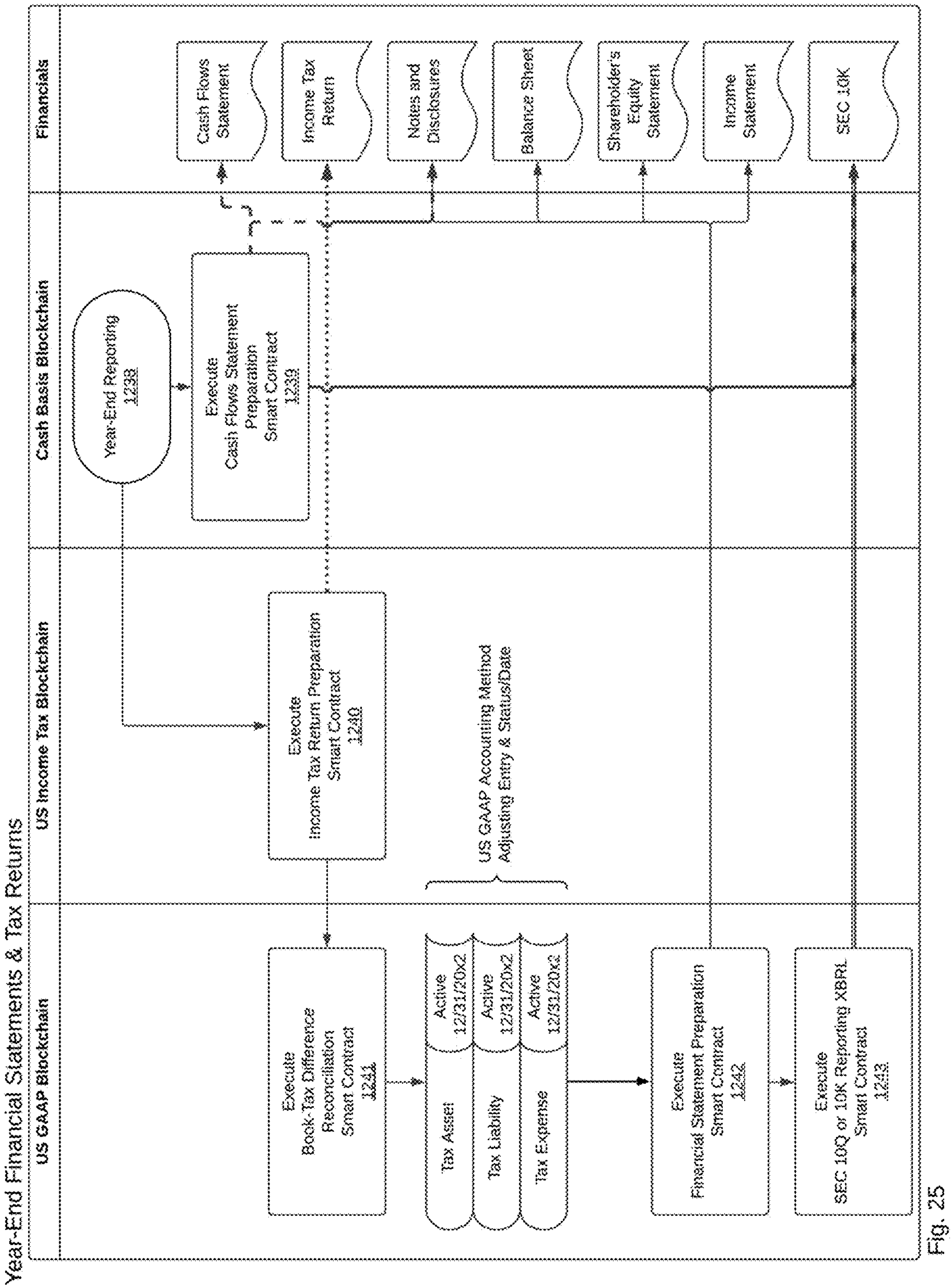
FIG. 25 is a process flow diagram of the smart contract reporting and adjustments of the year-end US GAAP financial statements, US Income Tax return, and US Securities and Exchange Commission method of accounting XBRL Form10 K.

FIG. 25 depicts the flow of year-end financial statement Reporting 1037 smart contract processes to generate US GAAP financial statements, tax returns, and US Securities and Exchange Commission XBRL Form 10 K. 1238: Start: Once the accounting method blockchains have been preliminarily closed (except for the income tax related adjustments) the operator executes the year end reporting 1037 smart contract. 1239: The reporting 1037 smart contract executes the cash basis 1198 reporting smart contract, which generates the Statement of Cash Flows as well as cash basis information in the financial statement notes and disclosures. 1240: The reporting 1037 smart contract executes the income tax return preparation smart contract, which generates the tax returns. 1241: The reporting 1037 smart contract executes the US GAAP Book to Tax reconciliation smart contract, which generates debit and credit blocks to adjust the current and non-current tax assets and liabilities against the US GAAP income tax expense. 1242: The US GAAP reporting smart contract generates the Balance Sheet, Income Statement, Shareholders' Equity Statement, and, accrual basis related financial statements' Notes and Disclosures. 1243: The US SEC reporting smart contract generates the SEC XBRL 10 K Annual Report.

Figure 26:
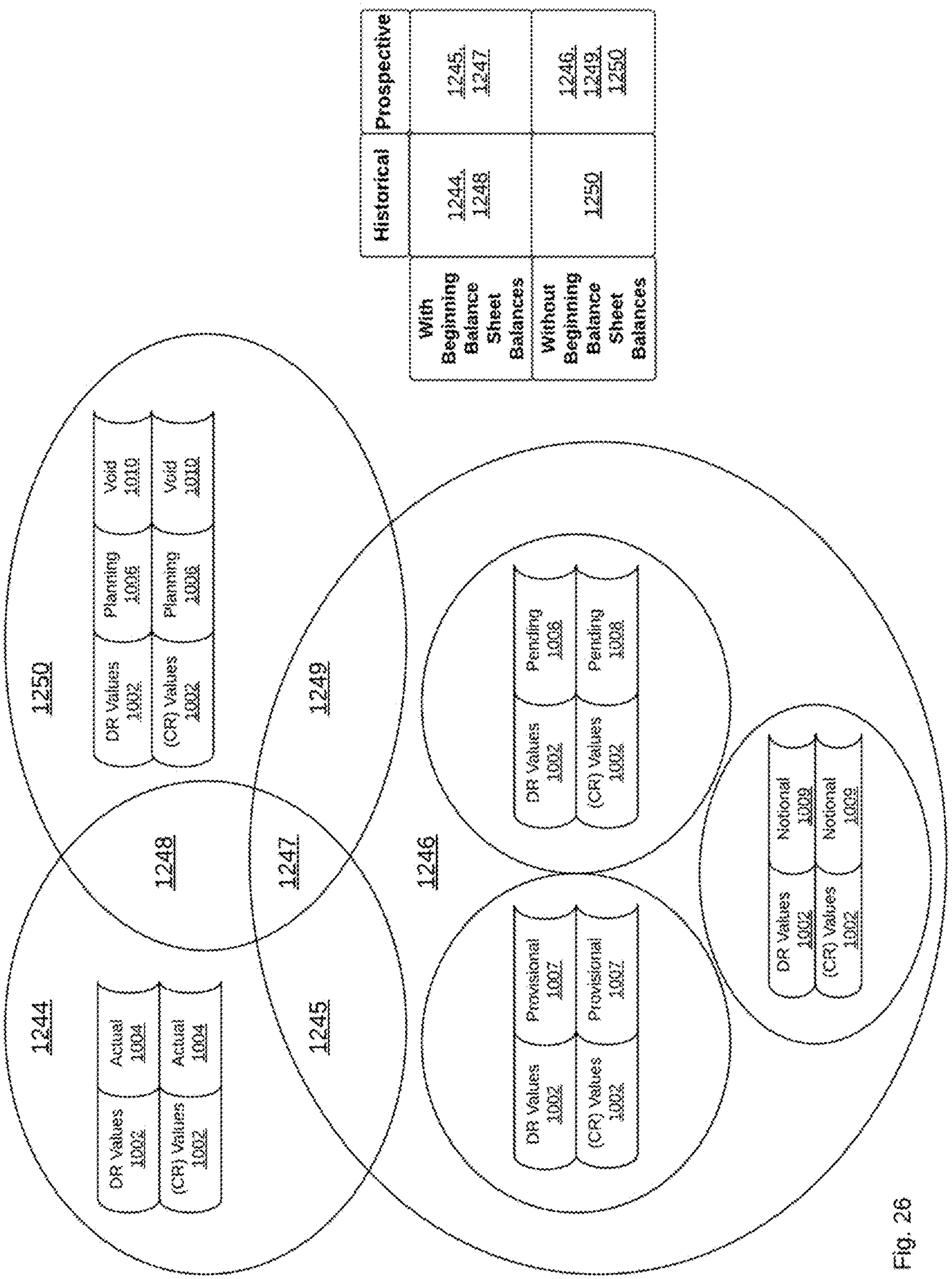
FIG. 26 is a Venn diagram of realized and unrealized status/date sets of journal entries to produce historical financial statements and prospective forecasts/projections.

FIG. 26 is a Venn diagram depicting the financial statements and reports that are created by grouping historical (Realized) and prospective (Unrealized) entries by status sets. By selecting various status blocks, an operator generates a host of financial analyses both historical (what-would-have-been) and prospective (expected results as well as what-could-have-been if all sales transactions were successful). 1244: Is limited to realized 1004 value blocks and represent historical financial statements. 1245: Joins realized 1004 with unrealized (provisional 1007, pending 1008, and, notional 1009) entries which represent a financial forecast with beginning balances. 1246: Joins unrealized (provisional 1007, pending 1008, and, notional 1009) entries which represent a financial forecast without beginning balances. 1247: The reporting value sets {realized 1004, provisional 1007, pending 1008, notional 1009, and planning/voids 1007/1010} represents a financial forecast with beginning balances and includes the expected results of operations as well as the effects had no transactions been ultimately rejected by prospective buyers. 1248: Represents historical financial statements of realized 1002 entries and the resulting balances had no extramural transactions been rejected (planning-voids 1007/1010) by a prospective buyer; that is, if all past proposed purchase offers been accepted resulting in successful sales. 1249: The reporting value sets {provisional 1007, pending 1008, notional 1009, and planning/voids 1007/1010} represents a financial forecast without beginning balances and includes the expected results of operations as well as the effects had no transactions been ultimately rejected by prospective buyers. 1250: Represents the historical (past planning/voids 1006/1010) or prospective (future planning/voids 1006/1010) results of potential transactions had no sales been ultimately rejected by a prospective buyer. The historical results would be demonstrated by using a financial statement date up to and including the current date, whereas prospective "what-if" results would use an end date in the future.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

The invention claimed is:

1. A method of executing smart contracts (1020) in a distributed ledger, comprising the steps to of:

evaluating, during a negotiation cycle of a transaction smart contract processing a transaction, a purchase offer that includes one or more conditional statement hypotheses, wherein said evaluating comprises:

receiving, by a seller's evaluating smart contract executed on a computer processor, the purchase offer from a buyer, wherein the purchase offer is stored on the distributed ledger;

in response to receiving the purchase offer, automatically generating, by the evaluating smart contract, one or more planning status data blocks and storing the planning status blocks on the distributed ledger representing an unevaluated state of a transaction;

automatically testing, by the evaluating smart contract, the conditional statement hypotheses against resource availability by initiating a cascade of intramural transaction smart contracts on the distributed ledger to downstream enterprise functions to thereby create a series of internal purchase offers that flow downstream through the seller's various functions to verify resource availability; and upon determining that the conditional statement hypotheses are satisfied, automatically executing an updating smart contract to transform the one or more planning status data blocks on the distributed ledger into one or more provisional status data blocks, thereby electronically locking in the transaction and changing a state of the transaction's record on the distributed ledger from the unevaluated state to an accepted but unfulfilled state;

computing values relating to the purchase transaction; and generating at least one of additional record blocks in the distributed ledger, financial statements, reports, and/or, charts and graphs that summarize schedule or other enterprise management information.

2. The method of claim 1, further comprising: at least one bills of process smart contract generating provisional resource reservation blocks and provisional transaction journal entries of downstream intramural purchase transactions through delivery to a buyer; and if the seller cannot accept the purchase offer terms, counteroffering by the seller an amended purchase offer including terms to an extramural offeror that the purchaser can fulfill.

3. The method of claim 1 further comprising: of generating an extramural purchase offer block by executing a transaction smart legal contract that includes terms and conditions of the purchase offer including the description of the resource to be purchased, quantity, price, delivery timing and credit terms; and additional information to record an asset or resource acquired upon completion of the transaction; and all prospective entries required by the sellers methods of accounting until sold, disposed, or, otherwise converted into another asset or resource.

4. The method of claim 2 of executing bills of process smart contracts required to deliver an asset or resource purchased through an extramural or intramural transaction smart contract, in which the bills of process smart contracts detail sequencing of operations, tools, machinery and labor required to create an asset or resource that ensures every step of the fulfillment process.

5. The method of claim 1 further comprising, executing an updating status smart contract to create a planned, provisional, or pending journal entry and underlying values and reservation blocks in the distributed ledger.

6. The method of claim 1 further comprising reserving an asset or resource in a scheduling smart contract for a specified date, time, and duration according to the at least one bills of process smart contract.

7. The method of claim 1 further comprising executing method of accounting smart contracts which generate and post current and prospective accounting adjustments to the distributed ledger for an asset or resource purchased through a transaction smart contract in accordance with methods of accounting of the seller for the asset or resource acquired.

8. The method of claim 1 further comprising executing reporting smart contracts which: sum the value blocks by account groupings in the format of financial statements and disclosures required by the method of accounting 1030; include the value blocks in mathematical computations; or, fulfill hypotheses in the seller's smart contract conditional statements.

* * * * *